US012683150B2

(12) United States Patent
Wu et al.

(10) Patent No.: US 12,683,150 B2
(45) Date of Patent: Jul. 14, 2026

(54) HIGH-NICKEL POSITIVE ELECTRODE ACTIVE MATERIAL, PREPARATION METHOD THEREOF, AND LITHIUM-ION BATTERY, BATTERY MODULE, BATTERY PACK AND POWER CONSUMING DEVICE COMPRISING SAME

(71) Applicant: CONTEMPORARY AMPEREX TECHNOLOGY (HONG KONG) LIMITED, Hong Kong (CN)

(72) Inventors: Qi Wu, Ningde City (CN); Qiang Chen, Ningde City (CN); Jingpeng Fan, Ningde City (CN); Tao Huang, Ningde City (CN); Qisen Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 220 days.

(21) Appl. No.: 17/969,630

(22) Filed: Oct. 19, 2022

(65) Prior Publication Data

US 2023/0083478 A1 Mar. 16, 2023

Related U.S. Application Data

(63) Continuation of application No. PCT/CN2021/118225, filed on Sep. 14, 2021.

(51) Int. Cl.
*H01M 4/36* (2006.01)
*C01G 53/50* (2025.01)
(Continued)

(52) U.S. Cl.
CPC ............ *H01M 4/366* (2013.01); *C01G 53/50* (2013.01); *H01M 4/485* (2013.01); *H01M 4/505* (2013.01);
(Continued)

(58) Field of Classification Search
CPC ...... H01M 4/366; H01M 4/485; H01M 4/505; H01M 4/525; H01M 2004/021;
(Continued)

(56) References Cited

U.S. PATENT DOCUMENTS

2011/0262796 A1* 10/2011 Shimooka ............. H01M 4/483
429/231.95
2013/0316237 A1* 11/2013 Miki ..................... H01M 4/525
427/58
(Continued)

FOREIGN PATENT DOCUMENTS

CN 106299305 A 1/2017
CN 106532018 A 3/2017
(Continued)

OTHER PUBLICATIONS

The Japan Patent Office (JPO) Notification of Reasons for Refusal for Application No. 2022-562376 Nov. 14, 2023 6 Pages (including translation).
(Continued)

*Primary Examiner* — Ula C Ruddock
*Assistant Examiner* — Olivia Mason Ruggiero
(74) *Attorney, Agent, or Firm* — ANOVA LAW GROUP, PLLC

(57) ABSTRACT

The present application provides a high-nickel ternary positive electrode active material, which comprises a core $Li_{1+a}[LixCoyMn_zM_b]O_2$, a fast ionic conductor $Li_\alpha Al_x Si_y O_4$ of a first shell layer, an oxide of an element R of a second shell layer, and a transition layer $Li_p R_q O_w$ formed between the first shell layer and the second shell layer. In the high-nickel ternary positive electrode active material of the present application, the surface impurity lithium amount is significantly reduced, and by creatively converting the surface impurity lithium into effective components in the fast ionic (Continued)

conductors $Li_\alpha Al_x Si_y O_4$ and $Li_p R_q O_w$ which accelerate the intercalation/deintercalation of lithium ions in the core material, the decomposition and gas production of an electrolyte solution caused by the surface impurity lithium is greatly improved, such that a high-nickel ternary lithium-ion battery has high energy density as well as good cycle performance and safety performance.

14 Claims, 5 Drawing Sheets

(51) Int. Cl.

| | | |
|---|---|---|
| *H01M 4/02* | (2006.01) | |
| *H01M 4/485* | (2010.01) | |
| *H01M 4/505* | (2010.01) | |
| *H01M 4/525* | (2010.01) | |

(52) U.S. Cl.
CPC ......... *H01M 4/525* (2013.01); *C01P 2002/54* (2013.01); *C01P 2004/61* (2013.01); *C01P 2004/86* (2013.01); *C01P 2006/40* (2013.01); *H01M 2004/021* (2013.01); *H01M 2004/028* (2013.01)

(58) Field of Classification Search
CPC .. H01M 2004/028; H01M 4/02; C01G 53/50; C01P 2002/54
See application file for complete search history.

(56) References Cited

U.S. PATENT DOCUMENTS

| | | | | |
|---|---|---|---|---|
| 2015/0171423 A1 * | 6/2015 | Kim | .................... | H01M 4/1391 |
| | | | | 429/231.95 |
| 2015/0228977 A1 * | 8/2015 | Toya | .................... | H01M 4/485 |
| | | | | 429/223 |
| 2021/0057722 A1 * | 2/2021 | Kawada | .............. | H01M 4/0428 |
| 2021/0265623 A1 * | 8/2021 | Tsujimura | ............. | H01M 4/628 |

FOREIGN PATENT DOCUMENTS

| | | | | |
|---|---|---|---|---|
| CN | 107994212 A | 5/2018 | | |
| CN | 108598400 A | 9/2018 | | |
| CN | 1108598400 B | * | 9/2018 | |
| CN | 108807931 A | | 11/2018 | |
| CN | 110690435 A | * | 1/2020 | |
| CN | 110880591 A | * | 3/2020 | |
| CN | 112349905 A | * | 2/2021 | ............. B82Y 40/00 |
| JP | 2016033902 A | | 3/2016 | |
| JP | 2021055182 A | | 4/2021 | |
| WO | 2019159563 A1 | | 8/2019 | |
| WO | 2020238968 A1 | | 12/2020 | |
| WO | 2021015511 A1 | | 1/2021 | |

OTHER PUBLICATIONS

The European Patent Office (EPO) Intention to Grant for 21935452.9 Oct. 31, 2023 5 Pages.
Japan Patent Office (JPO) Decision to Grant a Patent for JP Application No. 2022-562376 Apr. 23, 2024 5 Pages (including translation).
The World Intellectual Property Organization (WIPO) International Search Report and written opinion for PCT/CN2021/118225 Apr. 6, 2022 11 pages (including English translation).
The European Patent Office (EPO) Extended Search Report for EP Application No. 21935452.9 Jul. 12, 2023 3 Pages.
Hailin Zhang et al., "Optimizing Li2O—2B2O3 coating layer on LiNi0.8Co0.1Mn0.1O2 (NCM811) cathode material for high-performance lithium-ion batteries", International Journal of Green Energy, May 13, 2020, pp. 1-9.
Jiujun Zhang et al., "Surface-Coated LiNi0.8Co0.1Mn0.1O2 (NCM811) Cathode Materials by Al2O3, ZrO2 and Li2O—2B2O3 Thin-Layers for Improving the Performance of Lithium Ion Batteries", Frontiers in Materials, Nov. 15, 2019, pp. 1-36.
Xiang Zhang et al., "A facile in-situ coating strategy for Ni-rich cathode materials with improved electrochemical performance", Electrochimica Acta, Apr. 11, 2021, pp. 1-13.
Xifeng Zeng et al., "Enhancing High-Temperature and High-Voltage Performances of Single-Crystal LiNi0.5Co0.2Mn0.3O2 Cathodes through a LiBO2/LiAlO2 Dual-Modification Strategy", ACS Sustainable Chem. Eng. 2020, 8, pp. 6293-6304.
Ruirui Zhao et al., "Improving the Ni-rich LiNi0.5Co0.2Mn0.3O2 cathode properties at high operating voltage by double coating layer of Al2O3 and AlPO4", Journal of Alloys and Compounds, May 30, 2017, pp. 1-21.
State Intellectual Property Office of China Notification to Grant Patent Right for Application No. 202180084479.X Sep. 10, 2025 9 pages (including translation).

\* cited by examiner

HIGH-NICKEL POSITIVE ELECTRODE ACTIVE MATERIAL, PREPARATION METHOD THEREOF, AND LITHIUM-ION BATTERY, BATTERY MODULE, BATTERY PACK AND POWER CONSUMING DEVICE COMPRISING SAME

CROSS-REFERENCE TO RELATED APPLICATIONS

This application is a continuation application of PCT Patent Application No. PCT/CN2021/118225, entitled "HIGH-NICKEL POSITIVE ELECTRODE ACTIVE MATERIAL, PREPARATION METHOD THEREOF, AND LITHIUM-ION BATTERY, BATTERY MODULE, BATTERY PACK AND POWER CONSUMING DEVICE COMPRISING SAME" filed on Sep. 14, 2021, which is incorporated herein by reference in its entirety.

TECHNICAL FIELD

The present application relates to the field of electrochemistry, and in particular to a high-nickel positive electrode active material, a preparation method thereof, and a positive electrode plate, a lithium-ion battery, a battery module, a battery pack and a power consuming device comprising the same.

BACKGROUND ART

With the rapid development in the new energy field, lithium ion batteries, due to their advantages of good electrochemical performance, no memory effect and little environmental pollution, are widely applied in various large power devices, energy storage systems and various consumable products, especially in the field of new energy vehicles such as pure electric vehicles and hybrid electric vehicles.

Compared with lithium iron phosphate materials, nickel-cobalt-manganese ternary positive electrode active materials are widely used because of their high gram capacity. However, in the prior art, the energy density, cycle performance and safety performance of ternary lithium-ion batteries have not been comprehensively improved. In particular, the higher the content of nickel atoms in the ternary positive electrode active material, the more difficult it is to comprehensively improve the energy density, cycle performance and safety performance of a lithium-ion battery comprising the same, thereby greatly limiting the use of ternary lithium-ion batteries in a larger range.

Therefore, it is very difficult to design a lithium-ion battery integrating high energy density, good cycle performance and good safety performance.

SUMMARY OF THE INVENTION

The present application has been made in view of the above-mentioned problems, and an objective of the present application is to provide a high-nickel ternary positive electrode active material, such that a ternary lithium-ion battery integrates high energy density, good cycle performance and good safety performance.

A first aspect of the present application provides a high-nickel positive electrode active material with a core-shell structure, wherein the core comprises $Li_{1+a}[Ni_xCo_yMn_zM_b]O_2$, wherein $0.6 \leq x < 1$, $0 < y < 0.3$, $0 < z < 0.3$, $0 < a < 0.2$, $0 < b < 0.2$, $x+y+z+b=1$, M being at least one of Mg, Ca, Sb, Ce, Ti, Zr, Sr, Al, Zn, Mo and B;

the shell comprises a first shell layer coating the core, and a second shell layer coating the first shell layer; wherein the first shell layer is a fast ionic conductor consisting of four elements of lithium, aluminum, silicon and oxygen; and the second shell layer comprises an oxide of an element R, the R being selected from at least one of Al, B, Ti, P, Co and La.

In any embodiment, the shell further comprises a transition layer formed between the first shell layer and the second shell layer, and the transition layer comprises one or more fast ionic conductors $Li_pR_qO_w$ formed by the first shell layer component and the second shell layer component, wherein $1 \leq p \leq 4$, $1 \leq q \leq 5$, $1 \leq w \leq 12$, and p, q and w are all integers.

In any embodiment, the fast ionic conductor of the first shell layer is $Li_\alpha Al_X Si_Y O_4$, wherein $0 < X < 2.4$, $0 < Y < 1.8$, $0.8 \leq \alpha \leq 1.2$, and a ratio of the stoichiometric coefficient X of the element aluminum to the stoichiometric coefficient Y of the element silicon is 0.8 to 1.2.

In any embodiment, the fast ionic conductor $Li_pR_qO_w$ in the transition layer of the present application is selected from at least one of $LiAlO_2$, $Li_3BO_3$, $Li_4Ti_5O_{12}$, $Li_3PO_4$, $LiCoO_2$ or LiLaO.

In any embodiment, the nickel content of the high-nickel positive electrode active material in the present application is 80% or more, namely, $0.8 \leq x < 1$, based on the total atomic number of nickel, cobalt and manganese.

In any embodiment, in the core of the high-nickel positive electrode active material of the present application, M can be at least one of Sb, Ti, Zr, Sr, Al and B.

In any embodiment, in the high-nickel positive electrode active material of the present application, R can be at least one of Al, La, B, Co and Ti.

In any embodiment, in the high-nickel positive electrode active material of the present application, a mass ratio of the element lithium in the core to the element lithium in the shell layer is (40 to 1,300):1.

In any embodiment, when M is selected from one or more of Al, B or Ti, R is different from M, and based on the total mass of the high-nickel positive electrode active material, the mass content of the element M in the high-nickel positive electrode active material is 1,000 to 5,000 ppm, and optionally 3,000 to 5,000 ppm.

In any embodiment, when M is selected from one or more of Al, B or Ti, R is different from M, and based on the total mass of the high-nickel positive electrode active material, the mass content of the element R is 100 to 20,000 ppm.

In any embodiment, in the high-nickel positive electrode active material, a mass ratio of the element Si to the element R is 0.1 to 7.0:1, and optionally 0.1 to 4.4:1.

In any embodiment, based on the total mass of the high-nickel positive electrode active material, the total mass content of the elements silicon and aluminum in the first shell layer is 435 to 13,150 ppm.

In any embodiment, the volume-average particle size Dv50 of the high-nickel positive electrode active material of the present application is 1.5 to 20 μm, and the total thickness of the shell layer is 0.001 to 1 μm.

A second aspect of the present application provides a method for preparing a high-nickel positive electrode active material, comprising the following steps:

S1: a high-nickel ternary precursor coated with a silicon-aluminum hydroxide is provided to obtain a first intermediate;

S2: the first intermediate and an M precursor and a lithium precursor are mixed and sintered to obtain a second intermediate; and S3: the second intermediate and an R precursor are mixed and sintered to obtain the high-nickel positive electrode active material;

wherein the high-nickel positive electrode active material is a core-shell structure, the core comprises $Li_{1+a}$ $[Ni_xCo_yMn_zM_b]O_2$, wherein $0.6 \leq x < 1$, $0 < y < 0.3$, $0 < z < 0.3$, $0 < a < 0.2$, $0 < b < 0.2$, $x+y+z+b=1$, M being at least one of Mg, Ca, Sb, Ce, Ti, Zr, Sr, Al, Zn, Mo and B;

the shell comprises a first shell layer coating the core, and a second shell layer coating the first shell layer; wherein the first shell layer is a fast ionic conductor consisting of four elements of lithium, aluminum, silicon and oxygen; and the second shell layer comprises an oxide of an element R, the R being selected from at least one of Al, B, Ti, P, Co and La.

According to the preparation method of the present application, the raw materials have a wide range of sources, low cost and simple process, which is more conducive to large-scale industrialization.

In any embodiment, in the step S1, a process of preparing the high-nickel ternary precursor coated with a silicon-aluminum hydroxide is as follows:

(a) an aluminum precursor and a silicon precursor are completely dissolved in an alkaline solution, and then a high-nickel ternary precursor is added, to obtain a solid-liquid mixture; and (b) the pH of the solid-liquid mixture is lowered to initiate a hydrolysis-in-situ precipitation reaction between the aluminum precursor and the silicon precursor, to obtain a high-nickel ternary precursor coated with a silicon-aluminum hydroxide.

In any embodiment, in the step (a), the aluminum precursor and the silicon precursor are added into the alkaline solution in a molar ratio of aluminum to silicon of 0.8 to 1.2:1.

In any embodiment, in the step (a), based on the total mass of the solid-liquid mixture, the mass proportion of the high-nickel ternary precursor is 16% to 50%.

In any embodiment, in the step (a), the pH of the alkaline solution is 11 to 13; in the step (b), a weakly acid gas is introduced into the solid-liquid mixture at a flow rate of 1 to 20 mL/min, to lower the pH of the solid-liquid mixture to 8 to 10.

In any embodiment, in the step (b), the reaction temperature of the hydrolysis-in-situ precipitation reaction is 20 to 40° C., the reaction time is 0.1 to 2 h, and the linear speed of stirring is 1 to 6 m/s.

In any embodiment, in the step S2, letting the total molar weight of nickel atoms, cobalt atoms and manganese atoms in the first intermediate be Me2, then:

the lithium precursor in an addition amount enabling the lithium atoms to be (0.9 to 1.1)Me2 and the M precursor in an addition amount enabling the M atoms to be $(8 \times 10^{-4}$ to $180 \times 10^{-4})$Me2 are mixed with the first intermediate.

In any embodiment, in the step S2, the sintering temperature is 700 to 950° C., the sintering time is 10 to 20 h, and the sintering atmosphere is air or oxygen.

In any embodiment, in the step S3, letting the total molar weight of nickel atoms, cobalt atoms and manganese atoms in the second intermediate be Me3, then:

the R precursor in an addition amount enabling the R atoms to be $(16 \times 10^{-4}$ to $330 \times 10^{-4})$Me3 is mixed with the second intermediate.

In any embodiment, in the step S3, the sintering temperature is 200 to 700° C., the sintering time is 5 to 15 h, and the sintering atmosphere is air or oxygen.

A third aspect of the present application provides a positive electrode plate, comprising a high-nickel positive electrode active material of the first aspect of the present application or a high-nickel positive electrode active material prepared by the preparation method of the second aspect of the present application.

A fourth aspect of the present application provides a lithium-ion battery, comprising a high-nickel positive electrode active material of the first aspect of the present application or a high-nickel positive electrode active material prepared by the preparation method of the second aspect of the present application or a positive electrode plate of the third aspect of the present application.

A fifth aspect of the present application provides a battery module, comprising a lithium-ion battery of the fourth aspect of the present application. A method that is known in the prior art for preparing a battery module can be used in the preparation of the battery module.

A sixth aspect of the present application provides a battery pack, comprising at least one of a lithium-ion battery of the fourth aspect of the present application or a battery module of the fifth aspect of the present application. A method that is known in the prior art for preparing a battery pack can be used in the preparation of the battery pack.

A seventh aspect of the present application provides a power consuming device, comprising at least one of a lithium-ion battery of the fourth aspect of the present application, a battery module of the fifth aspect of the present application, or a battery pack of the sixth aspect of the present application, the lithium-ion battery or the battery module or the battery pack being used as a power supply of the power consuming device or an energy storage unit of the power consuming device. A method that is known in the prior art for preparing a power consuming device can be used in the preparation of the power consuming device.

Advantageous Effects

In the present application, a high-nickel ternary positive electrode active material is coated respectively with the fast ionic conductor of the first shell layer, particularly $Li_\alpha Al_x Si_y O_4$, the fast ionic conductor $Li_p R_q O_w$ of the transition layer and the oxide of the element R of the second shell layer, to obtain the high-nickel ternary positive electrode active material of the present application. In the high-nickel ternary positive electrode active material of the present application, the surface impurity lithium amount is significantly reduced, and by creatively converting the surface impurity lithium into effective components in the fast ionic conductors $Li_\alpha Al_x Si_y O_4$ and $Li_p R_q O_w$ which accelerate the intercalation/deintercalation of lithium ions in the core, the decomposition and gas production of an electrolyte solution caused by the surface impurity lithium is greatly improved, such that a high-nickel ternary lithium-ion battery has high energy density as well as good cycle performance and safety performance.

The battery module, the battery pack and the power consuming device of the present application comprise the lithium-ion battery provided by the present application and thus have at least the same advantages as the lithium-ion battery.

LIST OF REFERENCE NUMERALS

Figure 1:
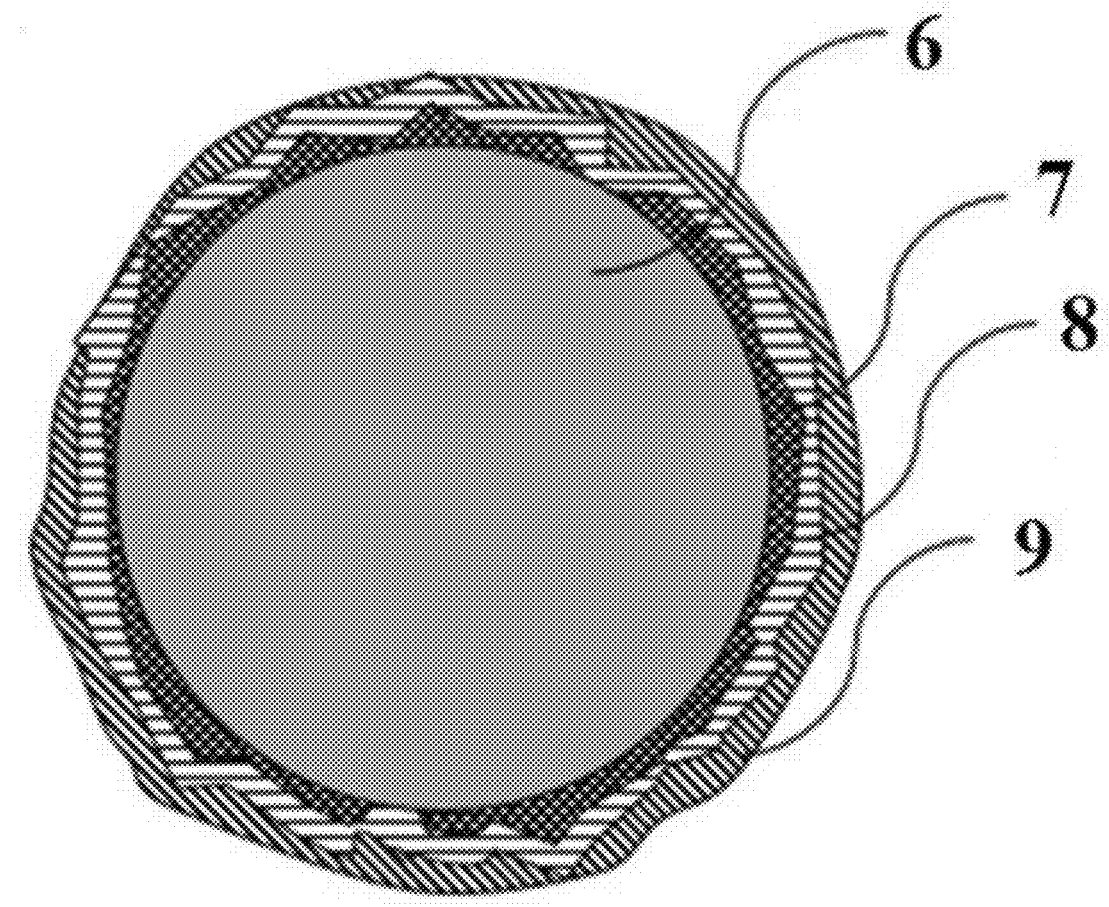
FIG. 1 is a structural schematic diagram of a high-nickel positive electrode active material according to an embodiment of the present application.

1—battery pack
2—upper case body
3—lower case body
4—battery module
5—lithium-ion battery
51—housing
52—electrode assembly
53—top cover assembly
6—core
7—first shell layer
8—transition layer
9—second shell layer

DETAILED DESCRIPTION OF EMBODIMENTS

Hereinafter, embodiments of a high-nickel positive electrode active material, a preparation method thereof, and a lithium-ion battery, a battery module, a battery pack and the power consuming device comprising the same specifically disclosed by the present application are described below in detail by appropriately referring to the accompanying drawings. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. In addition, if minimum range values 1 and 2 are listed, and if maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed in the text, and "0-5" is just an abbreviated representation of combinations of these numerical values. In addition, when a parameter is expressed as an integer of ≥2, it is equivalent to disclose that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

The term "not less than" and "not more than" used in the present application includes the number itself. For example, "not less than one" means one or more, and "at least one of A and B" means "A", "B" or "A and B".

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

Notably, the term "shell layer" refers to a part coating the "core" of the high-nickel positive electrode active material, the part may, but does not necessarily, completely coat the "shell", and the use of "shell" or "shell layer" or "first shell layer" or "transition layer" or "second shell layer" is merely for convenience of description, and is not intended to limit the present application. Similarly, "the second shell layer coats the first shell layer" means that the second shell layer completely or partially coats the first shell layer.

The term "high nickel content" means that the number of nickel atoms in the corresponding positive electrode active material is 60% or more based on the total atomic number of nickel, cobalt and manganese. Similarly, the term "nickel content" used herein refers to the percentage of the number of nickel atoms in the positive electrode active material based on the total atomic number of nickel, cobalt and manganese. The term "high-nickel ternary precursor" used in the present application refers to a nickel-cobalt-manganese ternary material in a form of hydroxide, where the atomic number of nickel is 60% or more based on the total atomic number of nickel, cobalt and manganese.

The term "fast ionic conductor" is also known as superionic conductor, or solid electrolyte in some cases. The most basic feature distinguishing it from common ionic conductors is that it has an ionic conductivity (0.01 Ω·cm) comparable to that of a liquid electrolyte and a low ionic conduction activation energy (≤0.40 eV) within a certain temperature range. As an example, the fast ionic conductors that may be present in the first shell layer and the second shell layer of the present invention comprise, for example, $LiAl_{0.971}Si_{1.022}O_4$, $Li_3BO_3$, etc.

The term "precursor" of a certain element used herein may refer to a raw material, or a compound which is obtained from a certain treatment on an initial material to comprise the element before obtaining a target product and can further react under the conditions of the preparation method of the present application to obtain the target product. For example, "a precursor" can be an oxide, hydroxide or water-soluble salt of a corresponding element. As an example, when M represent, for example, an element aluminum, its precursor can be metaaluminate or aluminum hydroxide; as another example, the precursor of an element lithium can be lithium hydroxide; and as still another example, the high-nickel ternary precursor refers to a complex hydroxide formed by five elements of nickel, cobalt, manganese, oxygen and hydrogen.

The inventors of the present application have found in practical operations that: for the nickel-cobalt-manganese ternary positive electrode active material, increasing the content of lithium in its layered structure can significantly improve the charge/discharge gram capacity of the material and thus the energy density of the lithium-ion battery. However, when the number of nickel atoms in the nickel-cobalt-manganese ternary positive electrode active material is increased to a percentage of 60% or more (based on the total atomic number of nickel, cobalt and manganese), the corresponding lithium-ion battery encounters a host of phenomena severely threatening the electrochemical performance and safety performance of the battery, such as a serious decline in cycle performance and a sharp increase in gas production inside the battery.

Through numerous studies, the inventors have found that the reasons for the above-mentioned adverse effects of the high-nickel ternary positive electrode active material are as follows: Firstly, with the repeated intercalation/deintercalation of lithium ions, the high-nickel ternary positive electrode active material, compared with a low-nickel ternary positive electrode active material, is more prone to lattice distortion in its microscopic layered structure, and the layered structure is more likely to collapse, which leads to a loss of its ability in intercalating/de-intercalating the lithium ions and finally causes a serious decline in the energy density and cycle performance of the lithium-ion battery. Secondly, the high-nickel ternary positive electrode active material has more surface impurity lithium (e.g., lithium oxide and lithium carbonate), which leads to serious side reactions on an interface where it gets in contact with an electrolyte solution and thus a sharp increase in gas production inside the battery, thereby significantly degrading the cycle performance and safety performance of the battery.

Therefore, although the high-nickel ternary positive electrode active material can improve the energy density of the battery by increasing the nickel content, the cycle performance and safety performance of the battery will be significantly degraded accordingly.

In the face of the above-mentioned research topics, the inventors of the present application, with an aim to improve the comprehensive performance of a ternary lithium-ion battery, have developed a high-nickel ternary positive electrode active material capable of comprehensively improving the energy density, cycle performance and safety performance of the lithium-ion battery by modifying the high-nickel ternary positive electrode active material.

[High-Nickel Ternary Positive Electrode Active Material]

The present application provides a high-nickel positive electrode active material, which is a core-shell structure, wherein the core comprises $Li_{1+a}[Ni_xCo_yMn_zM_b]O_2$, wherein $0.6 \leq x < 1$, $0 < y < 0.3$, $0 < z < 0.3$, $0 < a < 0.2$, $0 < b < 0.2$, $x+y+z+b=1$, M being at least one of Mg, Ca, Sb, Ce, Ti, Zr, Sr, Al, Zn, Mo and B;

the shell comprises a first shell layer coating the core, and a second shell layer coating the first shell layer; wherein the first shell layer is a fast ionic conductor consisting of four elements of lithium, aluminum, silicon and oxygen; and the second shell layer comprises an oxide of an element R, the R being selected from at least one of Al, B, Ti, P, Co and La.

In some embodiments, optionally, in the core of the positive electrode active material of the present application, a ratio of z to y is 2:1 to 1:2, and optionally 3:2 to 2:3.

In some embodiments, optionally, in the core of the positive electrode active material of the present application, a ratio of y to z and a ratio of y+z to x are 1:10 to 1:7, and optionally 1:9 to 1:8.

In some embodiments, optionally, the fast ionic conductor in the first shell layer is $Li_\alpha Al_X Si_Y O_4$, wherein $0 < X < 2.4$, $0 < Y < 1.8$, $0.8 \leq \alpha \leq 1.2$, and a ratio of the stoichiometric coefficient X of the element aluminum to the stoichiometric coefficient Y of the element silicon is 0.8 to 1.2.

The high-nickel positive electrode active material of the present application has a core-shell structure with two shell layers coating a core, where the core comprises $Li_{1+a}[Ni_xCo_yMn_zM_b]O_2$. The coating with two continuous shell layers can prevent collapse of the crystal structure that occurs after several charge/discharge cycles due to the intercalation/de-intercalation of lithium ions in the main body of the core material, namely, $Li_{1+a}[Ni_xCo_yMn_zM_b]O_2$ on one hand; and on the other hand, it can isolate the core material from direct contact with an electrolyte solution, so as to reduce corrosion of the surface of the positive electrode active material by the corrosive substances in the electrolyte solution, reduce side reactions of the electrolyte solution on the positive electrode surface, and prevent gas production inside the battery. In addition, the coating with two continuous shell layers can also prevent a dissolution phenomenon of the transition metal elements of the core material during the cycle and storage processes of the battery, thereby avoiding deposition of the dissolved transition metal elements on the negative electrode surface. Last but not least, the coating with two continuous shell layers can significantly improve the surface impurity lithium amount of the high-nickel positive electrode active material, and remarkably increase the relative proportion of active lithium in the high-nickel positive electrode active material. In a word, with the above-mentioned four effects, the coating with two continuous shell layers can comprehensively improve the energy density, cycle performance and safety performance of the high-nickel ternary lithium-ion battery.

Further, the core of the high-nickel positive electrode active material of the present application comprises $Li_{1+a}$ $[Ni_xCo_yMn_zM_b]O_2$. When the element M is doped into the core material, it can form $Li_{1+a}[Ni_xCo_yMn_zM_b]O_2$ with other elements in the core material, so that the structural stability of the core material is improved and the structural collapse of the core material during repeated charge/discharge cycles is prevented, thereby improving the cycle performance of the battery.

Notably, the high-nickel positive electrode active material of the present application is particularly applicable to a high-nickel ternary lithium-ion battery, particularly in a range of a nickel content of 60% or more, and particularly in a range of a nickel content of 80% or more. Optionally, the nickel content can be 60%, 80% or 90%.

Notably, when M is at least one of Sb, Ti, Zr, Sr, Al and B, the charge/discharge capacity, capacity retention rate during cycling and gas production of the lithium-ion battery are improved more significantly.

Further, the first shell layer is a fast ionic conductor layer consisting of four elements of lithium, aluminum, silicon and oxygen. For example, the fast ionic conductor is $Li_\alpha Al_X Si_Y O_4$. In the presence of the fast ionic conductor $Li_\alpha Al_X Si_Y O_4$: on one hand, the impurity lithium component on the surface of the core material can be creatively converted into structural lithium in $Li_\alpha Al_X Si_Y O_4$, and thus the impurity lithium of the high-nickel ternary positive electrode active material can be effectively reduced, to improve side reactions at the interface between the material and the electrolyte solution and enhance the cycle performance of the battery; and on the other hand, $Li_\alpha Al_X Si_Y O_4$ can significantly increase the intercalation/deintercalation rate of lithium ions, thereby improving the charge/discharge capacity and cycle performance of the battery.

Notably, for the fast ionic conductor $Li_\alpha Al_X Si_Y O_4$, a molar ratio of the Al atoms to the Si atoms, namely, a ratio of X to Y, is 0.8 to 1.2. When the ratio of X to Y is in the above-mentioned range, it is beneficial in forming a good fast ionic conductor on the surface of the positive electrode material, so that the reduction in the surface impurity lithium and interface side reactions of the material is facilitated, and also, the transport rate of lithium ions is increased, thereby improving the cycle performance and safety performance of the battery. Notably, when the content of Al or Si is too high, namely, the ratio of X to Y deviates from the above-mentioned range, low-activity substances of Al or Si are likely to form on the surface layer of the positive electrode material, which will affect the transport of lithium ions on the contrary.

Notably, $\alpha$ in the $Li_\alpha Al_X Si_Y O_4$ is in a range of 0.8 to 1.2, and optionally 1, or any natural number in the range of 0.8 to 1.2. When the value of a is lower than the above-mentioned range, the relative content of lithium ions of the fast ionic conductor in the first shell layer is relatively small, and the formed fast ionic conductor may have a poor transport rate of lithium ions, thereby affecting the battery performance. When the value of a is higher than the above-mentioned range, excessive lithium ions may lead to an increase in the impurity lithium amount on the surface of the positive electrode material and then an increase in side reactions at the interface with the electrolyte solution, thereby affecting the safety performance of the battery.

Further, the second shell layer comprises an oxide of an element R, the R being at least one of Al, B, Ti, P, Co and La. The provision of the second shell layer can prevent the component loss and structural damage of the fast ionic conductor $Li_\alpha Al_X Si_Y O_4$ caused by soaking in the electrolyte solution and isolate the core material from contact with the electrolyte solution, and thus plays an important role in improving the stability of the high-nickel positive electrode active material and is beneficial in improving the energy density, cycle performance and safety performance of the battery.

Notably, when R is an element Co, if the sintering temperature is too low during preparation of the second shell layer, for example, 200° C., a hydroxide $Co(OH)_2$ of the element Co may exist, which shall also be included in the scope of the present invention. Therefore, the term "an oxide of the element R" herein shall be interpreted as that in addition to the oxides of the element R, when R is an element Co, it also includes a hydroxide $Co(OH)_2$ of the element Co.

Notably, when R is at least one of Al, La, B, Co and Ti, the charge/discharge capacity, capacity retention rate during cycling and gas production of the lithium-ion battery are improved more significantly.

In some embodiments, the shell further comprises a transition layer formed between the first shell layer and the second shell layer, and the transition layer comprises one or more fast ionic conductors $Li_p R_q O_w$ formed by the first shell layer component and the second shell layer component, wherein $1 \le p \le 4$, $1 \le q \le 5$, $1 \le w \le 12$, and p, q and w are all integers.

In the shell layer of the high-nickel positive electrode active material of the present application, the transition layer is a transition region formed by the first shell layer and the second shell layer, and the component $Li_p R_q O_w$ included in the transition layer can further improve the intercalation/deintercalation rate of lithium ions in the high-nickel positive electrode active material. Therefore, in the high-nickel positive electrode active material of the present application, through a synergistic effect of two fast ionic conductor layers (namely, the first shell layer and the second shell layer), the gram capacity of the high-nickel positive electrode active material is greatly increased.

Notably, in the high-nickel positive electrode active material of the present application, a transition region similar to the transition layer between the first shell layer and the second shell layer can also be included between the core and the shell layer, which can be a continuous layered structure, or a discontinuous layered structure, with uniform or non-uniform thickness.

Notably, the transition layer formed between the first shell layer and the second shell layer is a continuous layered structure, and the connection between the first shell layer and the second shell layer is tighter because of the component $Li_p R_q O_w$, which prevents the second shell layer from falling during the use of the battery and is more beneficial in sufficiently increasing the gram capacity of the high-nickel positive electrode active material.

In some embodiments, optionally, the fast ionic conductor $Li_p R_q O_w$ in the transition layer is selected from at least one of $LiAlO_2$, $Li_3BO_3$, $Li_4Ti_5O_{12}$, $Li_3PO_4$, $LiCoO_2$ or $LiLaO$.

In some embodiments, optionally, the x is $0.8 \le x < 1$, the M is at least one of Sb, Ti, Zr, Sr, Al and B, and the R is at least one of Al, La, B, Co and Ti.

In some embodiments, optionally, in the high-nickel positive electrode active material of the present application, a mass ratio of the element lithium in the core layer to the element lithium in the shell layer is 40 to 1300:1.

In the high-nickel positive electrode active material of the present application, if a mass ratio of the element lithium in the core to the element lithium in the shell is within the above-mentioned range: on one hand, it can ensure the presence of enough active lithium in the core to contribute to a high gram capacity of the high-nickel positive electrode active material, thereby improving the energy density and cycle performance of the battery; on the other hand, it can ensure the presence of a proper amount of the element lithium in the first shell layer, the transition layer and the second shell layer to serve as an effective component to form fast ionic conductors $Li_\alpha Al_x Si_y O_4$ and $Li_p R_q O_w$; and in addition, a proper mass ratio of the element lithium in the core to the element lithium in the shell can effectively prevent the production of surface impurity lithium of the high-nickel positive electrode active material, so as to reduce the side reactions that occur inside the battery. In a word, through the above-mentioned three effects, a proper mass ratio of the element lithium in the core to the element lithium in the shell is beneficial in improving the energy density, cycle performance and safety performance of the battery (mainly embodied in an improvement in gas production inside the battery).

In some embodiments, optionally, when M is selected from one or more of Al, B or Ti, R is different from M, and based on the total mass of the high-nickel positive electrode active material, the mass content of the element M in the high-nickel positive electrode active material is 1,000 to 5,000 ppm, and optionally 3,000 to 5,000 ppm.

Compared with a low-nickel ternary positive electrode active material, the doping with the element M in the core material $Li_{1+a}[Ni_x Co_y Mn_z M_b]O_2$ can significantly improve the structural collapse and damage caused by repeated intercalation/deintercalation of lithium ions in the core material $Li_{1+a}[Ni_x Co_y Mn_z M_b]O_2$, and build a more stable channel for the transport of lithium ions, which is beneficial in increasing the gram capacity of the high-nickel positive electrode active material, thereby improving the energy density and cycle performance of the lithium-ion battery.

In some embodiments, optionally, when M is selected from one or more of Al, B or Ti, R is different from M, and based on the total mass of the high-nickel positive electrode active material, the mass content of the element R is 100 to 20,000 ppm.

By limiting the mass content of the element R in a reasonable range: on one hand, an oxide of R with a more stable physical and chemical structure can be formed, so as to effectively block corrosion of the core material and the first shell layer by the electrolyte solution and reduce side reactions inside the battery; and on the other hand, in the presence of the second shell layer containing the oxide of the element R, cracking and breakage of the high-nickel positive electrode active material can be effectively avoided, to prevent thermal runaway inside the battery caused by small particles produced by the broken core material. In conclusion, through the above-mentioned effects, by limiting the mass content of the element R in a reasonable range, the energy density, cycle performance and safety performance of the battery can be improved.

Further, when the mass content of the element R is 500 to 15,000 ppm, the charge/discharge capacity, capacity retention rate during cycling and gas production of the lithium-ion battery are improved more significantly.

In some embodiments, optionally, in the high-nickel positive electrode active material, a mass ratio of the element Si to the element R is 0.1 to 7.0:1, and optionally 0.1 to 4.4:1.

In the high-nickel positive electrode active material, a proper mass ratio of the element Si to the element R means that a mass ratio of the first shell layer to the second shell layer is in a proper range. With too little element of R and too much element of Si, namely, incomplete coating of the second shell layer and too thick coating of the first shell layer, it may not realize an effect of reducing the side reactions between the electrolyte solution and the surface of the high-nickel material, and is also likely to reduce the gram capacity of the material itself because of the too thick first shell layer (the element Si does not contribute to the capacity), thereby resulting in a low discharge capacity of the battery. On the contrary, with too much element of R and too little element of Si, namely, incomplete coating of the first shell layer and too thick coating of the second shell layer, it may cause the high-nickel positive electrode active material unable to build a complete network structure for fast conduction of lithium ions, thereby lowering the intercalation/deintercalation rate of lithium ions, reducing the gram capacity of the high-nickel positive electrode active material and the discharge capacity of the battery, and affecting the cycle performance of the battery; and also, it is also likely to reduce the gram capacity of the material itself because of the too thick second shell layer (the element R does not contribute to the capacity), thereby resulting in a low discharge capacity of the battery.

In some embodiments, optionally, based on the total mass of the high-nickel positive electrode active material, the total mass content of the elements silicon and aluminum in the first shell layer is 435 to 13,150 ppm.

The total mass content of the elements silicon and aluminum in the first shell layer corresponds to the amount of $Li_\alpha Al_x Si_y O_4$ in the first shell layer. When the surface of the high-nickel active material is coated with a layer of a fast ionic conductor $Li_\alpha Al_x Si_y O_4$, the transport rate of lithium ions can be effectively improved and side reactions between the surface and the electrolyte solution can be reduced, thereby improving the capacity and long-term performance; however, the coating should not be too little or too much because too little coating may have little effect, and too much coating may reduce the gram capacity of the material and increase the resistance to the transport of lithium ions.

In some embodiments, optionally, the volume-average particle size Dv50 of the high-nickel positive electrode active material is 1.5 to 20 μm, and the thickness of the shell layer is 0.001 to 1 μm. In the high-nickel positive electrode active material of the present application, if the volume-average particle size Dv50 of the particles is too large, it may increase the resistance to the intercalation/deintercalation of lithium ions and thus the internal resistance of the battery. And, the volume-average particle size Dv50 should not be too small, because a too small particle size increases the process complexity and the production cost on one hand, and also increase the contact area with the electrolyte solution on the other hand; and once the shell layer encounters loss of function, the battery performance may deteriorate sharply. Similarly, when the thickness of the shell layer is too large, the internal resistance of the battery is increased, and the gram capacity of the material is reduced. But when the thickness of the shell layer is too small, it may be difficult to effectively exert the beneficial functions of the shell layer.

The high-nickel positive electrode active material of the present application can be a polycrystalline ternary material, or a monocrystalline ternary material; and the polycrystalline ternary material has a polycrystalline structure, and the monocrystalline ternary material has a monocrystalline structure or a mono-like structure. When the high-nickel positive electrode active material is a polycrystalline structure, it contributes a higher gram capacity; and when the high-nickel ternary positive electrode active material is a monocrystalline structure or a mono-like structure, the corresponding lithium-ion battery has better cycle performance.

In some embodiments, the high-nickel positive electrode active material with a monocrystalline structure or mono-like structure of the present application can be synthesized by controlling the particle size of a high-nickel ternary precursor at 1 to 5 μm and increasing the roasting temperature of key preparation steps.

For example, in the method of the present application, a high-nickel positive electrode active material with a good monocrystalline or mono-like structure can be synthesized by increasing the sintering temperature of the step S2 from 700° C. to 950° C. and adjusting the particle size Dv50 of the precursor in the step S1 from 9 μm to 3 μm.

Those skilled in the art can select a high-nickel ternary positive electrode active material with a polycrystalline structure of the present application, or a high-nickel ternary positive electrode active material with a monocrystalline or mono-like structure according to different application scenarios of the lithium-ion battery.

The present application provides a method for preparing a high-nickel positive electrode active material, comprising the following steps:

S1: a high-nickel ternary precursor coated with a silicon-aluminum hydroxide is provided to obtain a first intermediate;

S2: the first intermediate and an M precursor and a lithium precursor are mixed and sintered to obtain a second intermediate; and S3: the second intermediate and an R precursor are mixed and sintered to obtain the high-nickel positive electrode active material;

wherein the high-nickel positive electrode active material is a core-shell structure, the core comprises $Li_{1+a}[Ni_xCo_yMn_zM_b]O_2$, wherein $0.6 \leq x < 1$, $0 < y < 0.3$, $0 < z < 0.3$, $0 < a < 0.2$, $0 < b < 0.2$, $x+y+z+b=1$, M being at least one of Mg, Ca, Sb, Ce, Ti, Zr, Sr, Al, Zn, Mo and B;

the shell comprises a first shell layer coating the core, and a second shell layer coating the first shell layer; wherein the first shell layer is a fast ionic conductor consisting of four elements of lithium, aluminum, silicon and oxygen; and the second shell layer comprises an oxide of an element R, the R being selected from at least one of Al, B, Ti, P, Co and La.

According to preparation method of the present application, the raw materials have a wide range of sources, low cost and simple process, which is more conducive to large-scale industrialization.

In some embodiments, optionally in the step S1, a process of preparing the high-nickel ternary precursor coated with a silicon-aluminum hydroxide is as follows:

(a) an aluminum precursor and a silicon precursor are completely dissolved in an alkaline solution, and then a high-nickel ternary precursor is added, to obtain a solid-liquid mixture; and (b) the pH of the solid-liquid mixture is lowered to initiate a hydrolysis-in-situ precipitation reaction between the aluminum precursor and the silicon precursor, to obtain a high-nickel ternary precursor coated with a silicon-aluminum hydroxide.

In the step (a), the aluminum precursor can be one or more of sodium metaaluminate ($NaAlO_2$), potassium metaaluminate ($KAlO_2$) and lithium metaaluminate ($LiAlO_2$), and the silicon precursor can be one or more of sodium silicate ($Na_2O \cdot nSiO_2$), potassium silicate ($K_2O \cdot nSiO_2$) and lithium silicate ($Li_2O \cdot nSiO_2$).

In the step (a), the solid-liquid mixture remains at a relatively high pH, which can ensure that the aluminum precursor and the silicon precursor are fully dissolved to such an extent as not to cause excessive hydrolysis of the aluminum precursor and the silicon precursor. The addition of the high-nickel ternary precursor provides a precipitation surface for the subsequent hydrolysis-in-situ precipitation reaction between the aluminum precursor and the silicon precursor.

Further, in the step (b), lowering the pH of the solid-liquid mixture can initiate a hydrolysis-in-situ precipitation reaction between the aluminum precursor and the silicon precursor, such that the silicon-aluminum hydroxides produced by the hydrolysis are co-precipitated on the surface of the high-nickel ternary precursor, to obtain the first intermediate.

Further, in the step (a), the aluminum precursor and the silicon precursor are added into the alkaline solution in a molar ratio of aluminum to silicon of 0.8 to 1.2:1.

Further, in the step (a), based on the total mass of the solid-liquid mixture, the mass proportion of the high-nickel ternary precursor is 16% to 50%.

Further, in the step (a), the pH of the alkaline solution is 11 to 13, to prevent hydrolysis of the aluminum precursor and the silicon precursor.

Further, a weakly acid gas is introduced into the solid-liquid mixture at a flow rate of 1 to 20 mL/min, to lower the pH of the solid-liquid mixture to 8 to 10.

In some embodiments, optionally, the weakly acid gas is one or more of $CO_2$ and $SO_2$.

Further, in the step (b), the reaction temperature of the hydrolysis-in-situ precipitation reaction is 20 to 40° C., the reaction time is 0.1 to 2 h, and the linear speed of stirring is 1 to 6 m/s.

In some embodiments, optionally, in the step S2, letting the total molar weight of nickel atoms, cobalt atoms and manganese atoms in the first intermediate be Me2, then:

the lithium precursor in an addition amount enabling the lithium atoms to be (0.9 to 1.1)Me2 and the M precursor in an addition amount enabling the M atoms to be $(8 \times 10^{-4}$ to $180 \times 10^{-4})$Me2 are mixed with the first intermediate.

Further, in the step S2, the sintering temperature is 700 to 950° C., the sintering time is 10 to 20 h, and the sintering atmosphere is air or oxygen.

In some embodiments, optionally, in the step S3, letting the total molar weight of nickel atoms, cobalt atoms and manganese atoms in the second intermediate be Me3, then:

the R precursor in an addition amount enabling the R atoms to be $(16 \times 10^{-4}$ to $330 \times 10^{-4})$Me3 is mixed with the second intermediate.

In some embodiments, the R precursor can be one or more of Al-containing oxides, hydroxides or inorganic acid salts, the R precursor can be one or more of B-containing oxides, hydroxides or inorganic acid salts, the R precursor can be one or more of Ti-containing oxides, hydroxides or inorganic acid salts, the R precursor can be one or more of P-containing oxides, hydroxides or inorganic acid salts, the R precursor can be one or more of Co-containing oxides, hydroxides or inorganic acid salts, and the R precursor can be one or more of La-containing oxides, hydroxides or inorganic acid salts.

In some embodiments, optionally, in the step S3, the sintering temperature is 200 to 700° C., the sintering time is 5 to 15 h, and the sintering atmosphere is air or oxygen. Here, notably, the sintering temperature in the step S3 is at least 500° C. lower than that in the step S2 such that the element M in the step S2 enters the core structure, but the element R in the step S3 generally does not enter the core structure.

[Positive Electrode Plate]

The present application provides a positive electrode plate, comprising a high-nickel positive electrode active material of the present application.

The positive electrode plate comprises a positive electrode current collector and a positive electrode material provided on at least one surface of the positive electrode current collector. As an example, the positive electrode current collector has two surfaces opposite in its own thickness direction, and the positive electrode material is provided on either or both of the two opposite surfaces of the positive electrode current collector.

In the lithium ion battery of the present application, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, aluminum alloys, nickel, nickel alloys, titanium, titanium alloys, silver and silver alloys, etc.) on a polymer material substrate (a substrate such as polypropylene (PP), polyethylene terephthalate (PET), polybutylene terephthalate (PBT), 1,3-propanesultone (PS), polyethylene (PE), etc.), but the present application is not limited to these materials.

The positive electrode material further optionally comprises a conductive agent. However, the type of the conductive agent is not limited specifically, and can be selected by those skilled in the art according to actual requirements. An example, the conductive agent for the positive electrode material may be selected from at least one of superconductive carbon, acetylene black, carbon black, ketjenblack, carbon dots, carbon nanotubes, graphene, and carbon nanofibers.

In the present application, the positive electrode plate can be prepared according to a method known in the art. As an example, the positive electrode active material of the present application, a conductive agent and a binder can be dispersed into a solvent (e.g., N-methylpyrrolidone (NMP)) to form a uniform positive electrode slurry; and the positive electrode slurry is coated onto a positive electrode current collector, and is then subjected to procedures such as drying and cold pressing, so as to obtain the positive electrode plate.

[Negative Electrode Plate]

A negative electrode plate comprises a negative electrode current collector and a negative electrode film layer disposed on at least one surface of the negative electrode current collector, wherein the negative electrode film layer comprises a negative electrode active material.

As an example, the negative electrode current collector has two surfaces opposite in its own thickness direction, and the negative electrode film layer is disposed on either or both of the two opposite surfaces of the negative electrode current collector.

In the lithium-ion battery of the present application, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming metal materials (copper, copper alloys, nickel, nickel alloys, titanium, titanium alloys, silver and silver alloys, etc.) on a polymer material substrate (such as polypropylene (PP), polyethylene terephthalate (PET), polybutylene terephthalate (PBT), polystyrene (PS), polyethylene (PE), etc.), but the present application is not limited to these materials.

In the negative electrode plate of the present application, the negative electrode film layer usually comprises the negative electrode active material and an optional binder, an optional conductive agent and other optional auxiliary agents, and is usually formed by coating a negative electrode slurry, followed by drying. The negative electrode slurry is generally formed by dispersing a negative electrode active material, and an optional conductive agent and a binder etc., into a solvent and uniformly stirring same. The solvent can be N-methylpyrrolidone (NMP) or deionized water.

As an example, the conductive agent can be selected from at least one of superconductive carbon, acetylene black, carbon black, ketjenblack, carbon dots, carbon nanotubes, graphene, and carbon nanofibers.

In the negative electrode plate of the present application, in addition to the negative electrode active material, the negative electrode film layer further optionally comprises other common negative electrode active materials, and examples of other common negative electrode active materials may include artificial graphite, natural graphite, soft carbon, hard carbon, silicon-based materials, tin-based materials and lithium titanate. The silicon-based material can be selected from at least one of elemental silicon, silicon oxide compounds, silicon-carbon composites, silicon-nitrogen composites and silicon alloys. The tin-based material can be selected from at least one of elemental tin, tin oxide compounds, and tin alloys.

[Electrolyte]

An electrolyte is located between the positive electrode plate and the negative electrode plate and functions for ionic conduction. The type of the electrolyte is not particularly limited in the present application, and can be selected according to actual requirements. For example, the electrolyte can be selected from at least one of solid electrolyte and liquid electrolyte (i.e., electrolyte solution).

In some embodiments, an electrolyte solution is used as the electrolyte. The electrolyte solution comprises an electrolyte salt and a solvent.

In some embodiments, the electrolyte salt can be selected from at least one of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bisfluorosulfonimide (LiFSI), lithium bistrifluoromethanesulfonimide (LiTFSI), lithium trifluoromethanesulfonate (LiTFS), lithium difluorooxalate borate (LiDFOB), lithium dioxalate borate (LiBOB), lithium difluorophosphate (LiPO2F2), lithium bisoxalatodifluorophosphate (LiDFOP) and lithium tetrafluorooxalate phosphate (LiTFOP).

In some embodiments, the solvent can be selected from at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS) and diethyl sulfone (ESE).

In some embodiments, the electrolyte solution further optionally comprises an additive. For example, the additive can include a negative electrode film-forming additive, a positive electrode film-forming additive, and also an additive that can improve certain performance of the battery, such as an additive that improve the overcharge performance of the battery, an additive that improve the high temperature performance of the battery, and an additive that improve the low temperature performance of the battery.

[Separator]

A lithium ion battery using an electrolyte solution and some lithium ion batteries using a solid electrolyte further comprise a separator. The separator is provided between the positive electrode plate and the negative electrode plate, and functions for separation. The type of the separator is not particularly limited in the present application, and any well known porous-structure separator with good chemical stability and mechanical stability can be selected. In some embodiments, the material of the separator can be selected from at least one of glass fibers, non-woven fabrics, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

[Lithium-Ion Battery]

In some embodiments, the positive electrode plate, the negative electrode plate and the separator can be made into an electrode assembly by a winding process or a lamination process, and the positive electrode plate comprises a high-nickel positive electrode active material of the present application.

In some embodiments, the lithium ion battery may comprise an outer package. The outer package can be used to encapsulate the above-mentioned electrode assembly and electrolyte.

In some embodiments, the outer package of the lithium-ion battery can be a hard housing, for example, a hard plastic housing, an aluminum housing, a steel housing, etc. The outer package of the lithium-ion battery can also be a soft bag, for example, a pouch-type soft bag. The material of the soft package may be plastics, and the examples of plastics may include polypropylene (PP), polybutylene terephthalate (PBT), and polybutylene succinate (PBS), etc.

The shape of the lithium-ion battery is not particularly limited in the present application, and can be a cylindrical shape, a square shape or any other shape. For example, FIG. 3 is a lithium-ion battery 5 of a square structure as an example.

Figures 3, 4, 5:
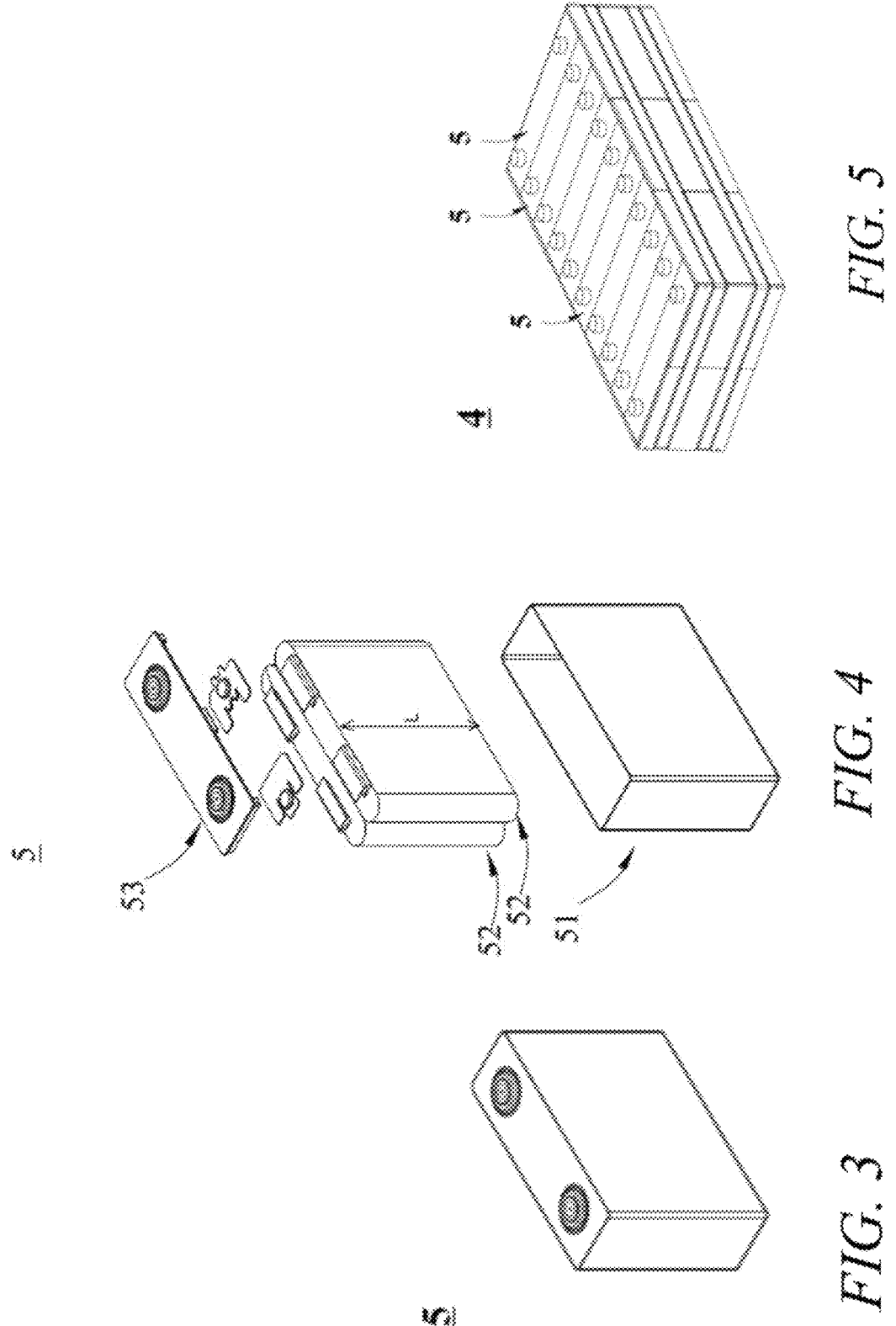
FIG. 3 is a schematic diagram of a lithium-ion battery according to an embodiment of the present application.
FIG. 4 is an exploded view of the lithium-ion battery shown in FIG. 3 according to an embodiment of the present application.
FIG. 5 is a schematic diagram of a battery module according to an embodiment of the present application.

In some embodiments, referring to FIG. 4, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is encapsulated in the accommodating cavity. An electrolyte solution is infiltrated into the electrode assembly 52. The number of the electrode assemblies 52 contained in the lithium-ion battery 5 may be one or more, and can be selected by those skilled in the art according to specific requirements.

[Battery Module]

In some embodiments, the lithium-ion batteries can be assembled into a battery module, and the number of the lithium-ion batteries contained in the battery module may be one or more, and the specific number can be selected by those skilled in the art according to the application and capacity of the battery module.

FIG. 5 shows a battery module 4 as an example. With reference to FIG. 5, in the battery module 4, a plurality of lithium ion batteries 5 can be provided in sequence in the length direction of the battery module 4. Apparently, the secondary batteries can also be arranged in any other manner. Further, the plurality of lithium-ion batteries 5 can be fixed with fasteners.

Optionally, the battery module 4 may further comprise a housing with an accommodating space, and a plurality of lithium-ion batteries 5 are accommodated in the accommodating space.

[Battery Pack]

In some embodiments, the above battery module can also be assembled into a battery pack, and the number of the battery modules contained in the battery pack can be selected by those skilled in the art according to the application and capacity of the battery pack.

Figures 6, 7:
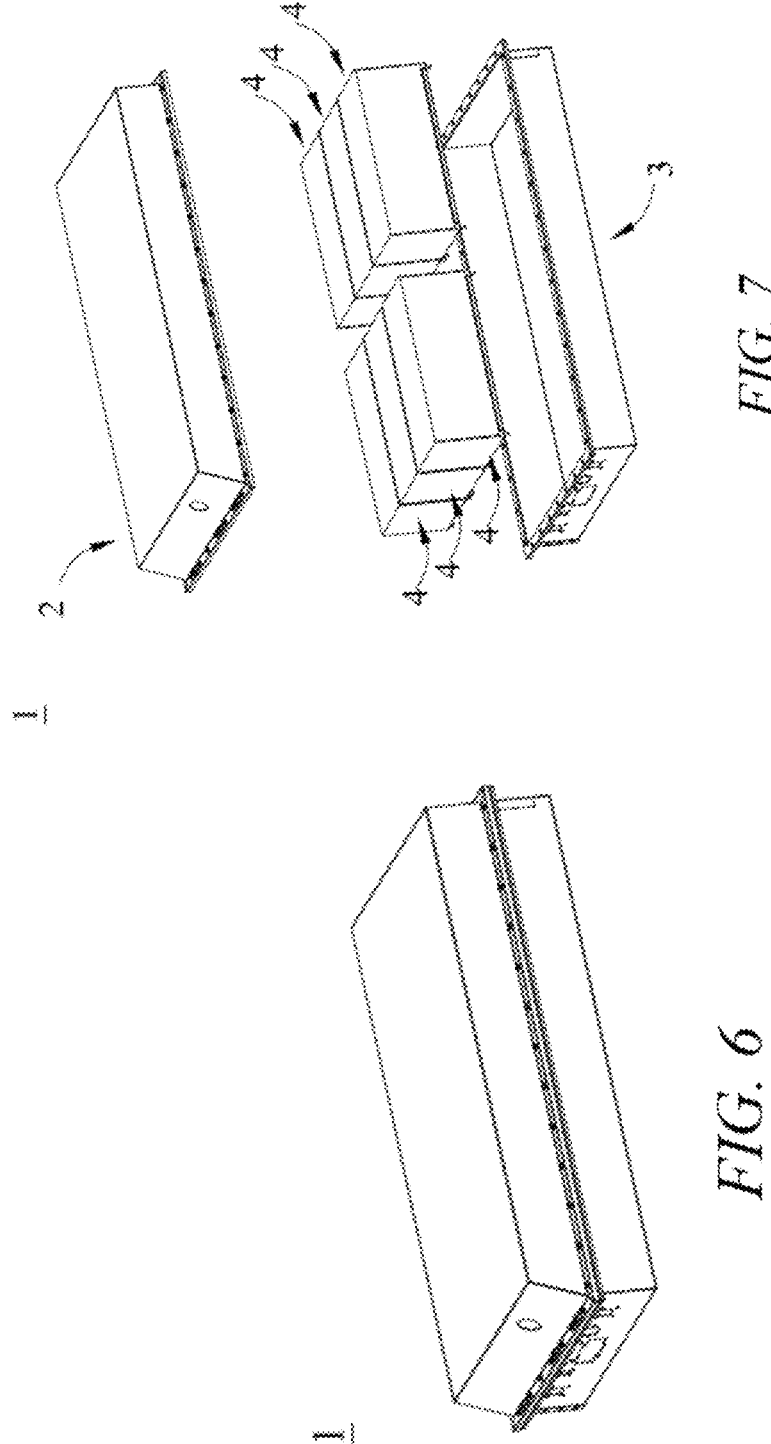
FIG. 6 is a schematic diagram of a battery pack according to an embodiment of the present application.
FIG. 7 is an exploded view of the battery pack shown in FIG. 6 according to an embodiment of the present application.

FIG. 6 and FIG. 7 show a battery pack 1 as an example. Referring to FIG. 6 and FIG. 7, the battery pack 1 may comprise a battery case and a plurality of battery modules 4 provided in the battery case. The battery case comprises an upper case body 2 and a lower case body 3, wherein the upper case body 2 can cover the lower case body 3 to form a closed space for accommodating the battery modules 4. A plurality of battery modules 4 can be arranged in the battery case in any manner.

[Power Consuming Device]

In addition, the present application also provides a power consuming device, comprising at least one of a lithium-ion battery, a battery module, or a battery pack provided by the present application. The lithium-ion battery, the battery module or the battery pack may be used as a power supply of the device, or as an energy storage unit of the device. The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like.

As for the power consuming device, the lithium-ion battery, the battery module or the battery pack can be selected according to the usage requirements thereof.

Figure 8:
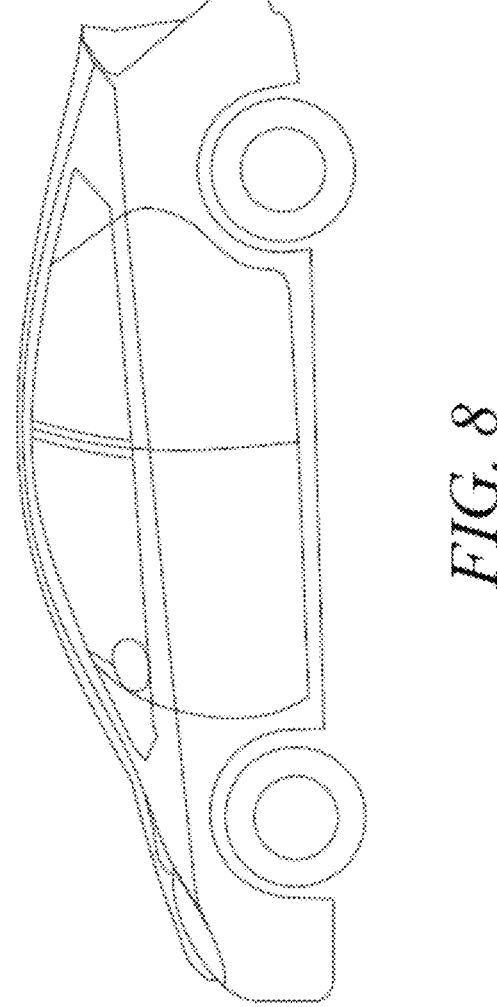
FIG. 8 is a schematic diagram of a power consuming device according to an embodiment of the present application.

FIG. 8 shows a device as an example. The device may be a pure electric vehicle, a hybrid electric vehicle, a plug-in hybrid electric vehicle or the like. In order to meet the requirements of the device for a high power and a high energy density of a lithium ion battery, a battery pack or a battery module can be used.

As another example, the device may be a mobile phone, a tablet, a laptop computer, etc. This device is generally required to be thin and light, and a lithium ion battery can be used as a power supply.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. Reagents or instruments for which manufacturers are not specified, are all commonly used conventional products in the art that are commercially available. The content of each component in the examples of the present application is based on mass, unless otherwise stated.

Example 1

[Preparation of a High-Nickel Ternary Positive Electrode Active Material]

S1, preparation of a first intermediate: 13.02 g of sodium metaaluminate (based on $NaAlO_2$) and 19.37 g of sodium silicate (based on $Na_2O \cdot SiO_2$) were dissolved in 2 L of an aqueous solution of NaOH with pH=12.2, then 953.00 g of a high-nickel ternary precursor $(Ni_{0.9}Co_{0.05}Mn_{0.05})(OH)_2$ with a median particle size Dv50 of 9.0 μm was added, and stirring was started; during the stirring, a gas $CO_2$ was introduced at a flow rate of 10 mL/min, and the stirring was performed continuously at 30° C. for 2 h at a linear speed of 3 m/s; and after the stirring was stopped, suction filtration, drying and sieving were performed to obtain a high-nickel ternary precursor coated with a silicon-aluminum hydroxide, namely, the first intermediate;

S2, preparation of a second intermediate: 980.62 g of the first intermediate, 472 g of lithium hydroxide (based on $LiOH \cdot H_2O$) and 8.33 g of titanium oxide (based on $TiO_2$) were mixed uniformly, and sintered at 700° C. for 20 h in an oxygen atmosphere, to obtain the second intermediate; and S3, obtaining of a target product: 1,000 g of the second intermediate and 3.18 g of boron oxide (based on B203) were mixed uniformly, and sintered at 200° C. for 5 h in an oxygen atmosphere, to obtain a high-nickel positive electrode active material of Example 1.

Specific parameters for preparing the high-nickel positive electrode active materials in other examples and comparative examples are shown in Tables A to H.

The product parameters of the high-nickel active materials and the performance parameters of the lithium-ion batteries in the examples and comparative examples are shown in Tables 1 to 8.

[Positive Electrode Plate]

The above-mentioned high-nickel positive electrode active material, a binder polyvinylidene fluoride (PVDF) and a conductive agent acetylene black were uniformly mixed with a solvent N-methyl pyrrolidone (NMP) in a mass ratio of 94:3:3, to obtain a positive electrode slurry; and the positive electrode slurry was coated onto an aluminum foil, followed by drying, cold pressing and slitting, to obtain a positive electrode plate.

[Negative Electrode Plate]

Negative electrode active materials artificial graphite and hard carbon, a conductive agent acetylene black, a binder styrene butadiene rubber (SBR) and a thickening agent sodium carboxymethylcellulose (CMC-Na) were uniformly mixed with deionized water in a mass ratio of 90:5:2:2:1 to give a mixture, and the mixture was coated onto a copper foil, followed by drying and cold pressing, to obtain a negative electrode plate of Example 1.

[Electrolyte Solution]

EC, DEC and DMC were mixed in a volume ratio of 1:1, and $LiPF_6$ was added to form an electrolyte solution, where in the electrolyte solution, the concentration of $LiPF_6$ was 1 mol/L.

[Separator]

Polypropylene Separator.

[Preparation of a Lithium-Ion Battery]

The positive electrode plate, the separator and the negative electrode plate were laminated in sequence, with the separator being located between the positive electrode plate and the negative electrode plate to function for separation, and wound to form a square bare cell; the square bare cell was put into an aluminum plastic film, a corresponding non-aqueous electrolyte solution was injected, and the aluminum plastic film was sealed; and the procedures such as standing, hot and cold pressing, forming, clamping and capacity grading were performed, to obtain a lithium-ion battery.

[Test of Relevant Parameters of the High-Nickel Positive Electrode Active Material]

1. Test of Surface Impurity Lithium Amount

Acid-base titration method: 30 g of the high-nickel positive electrode active material of the example was put into 100 ml of deionized water and stirred for 30 min, and allowed to stand for 5 min before suction filtration. 10 mL of a supernatant was titrated with a 0.05 mol/L standard solution of hydrochloric acid. With a pH electrode as an indicator electrode, end points were determined using the sudden leap produced by potential changes, and the surface impurity lithium amount Q (unit: ppm) of the positive electrode plate was calculated. A specific formula was: $Q=V2×C×6.94×n×100/(m×1,000)×100,000$, where C is the concentration of the standard solution of hydrochloric acid (unit: mol/L); V2 is the total volume (unit: mL) of the standard solution of hydrochloric acid consumed from the start of titration to the second end point of titration; n is a ratio of V2 to V1, and V1 is the total volume of 10 mL of the supernatant and V2 after the titration; and m is the mass of the sample (unit: g).

2. Test of the Content of Each Element in the High-Nickel Positive Electrode Active Material A plasma emission spectrometer (ICP-OES) of model ICAP7400 of US Thermo Fisher Scientific was used. 1 g of the sample was put into a beaker, 25 ml of a HNO3 solution with a mass fraction of 25% was added to the sample to dissolve the sample, 475 ml of deionized water was used for dilution, then the diluted liquid was put into the instrument for analysis of a target element, and the content of the target element was calculated.

3. Test of the Mass Distribution of Element Lithium in the Core and Element Lithium in the Shell Layer An ion polisher IB-19500CP and an EPMA (Electron Probe Microanalysis) device were used together. The tools for sample preparation were washed, a glue for sample preparation (a colloid formed by dispersing PVDF into NMP, with a mass content of PVDF of 8%) was uniformly mixed with the sample powder (the powder weight was about 5 times that of the glue), and the mixture was coated onto a copper foil and dried at 60° C. for 30 min. The prepared sample was cut with a pair of scissors into a size of 6 mm×6 mm, and the sample was fixed on a sample table and put into the ion polisher (model: IB-19500CP) for cutting, to obtain a section with an obvious boundary between the core structure and the layer structure; with reference to the section and through an EPMA test, 3 points were chosen from the core and the shell layer respectively for analysis and test of the element lithium, and an average was taken as the mass percentage content of the element lithium in the core and the shell layer respectively. Refer to the standard NF A92-801-4-2006 (NF A92-801-4-2006, Advanced Industrial Ceramics, Test Method of Ceramic Coatings, Part 4: Use electron probe microanalysis (EPMA) to measure chemical components) for the detailed operation procedure of EPMA.

4. Test of Volume-Average Particle Size Dv50

Figure 2:
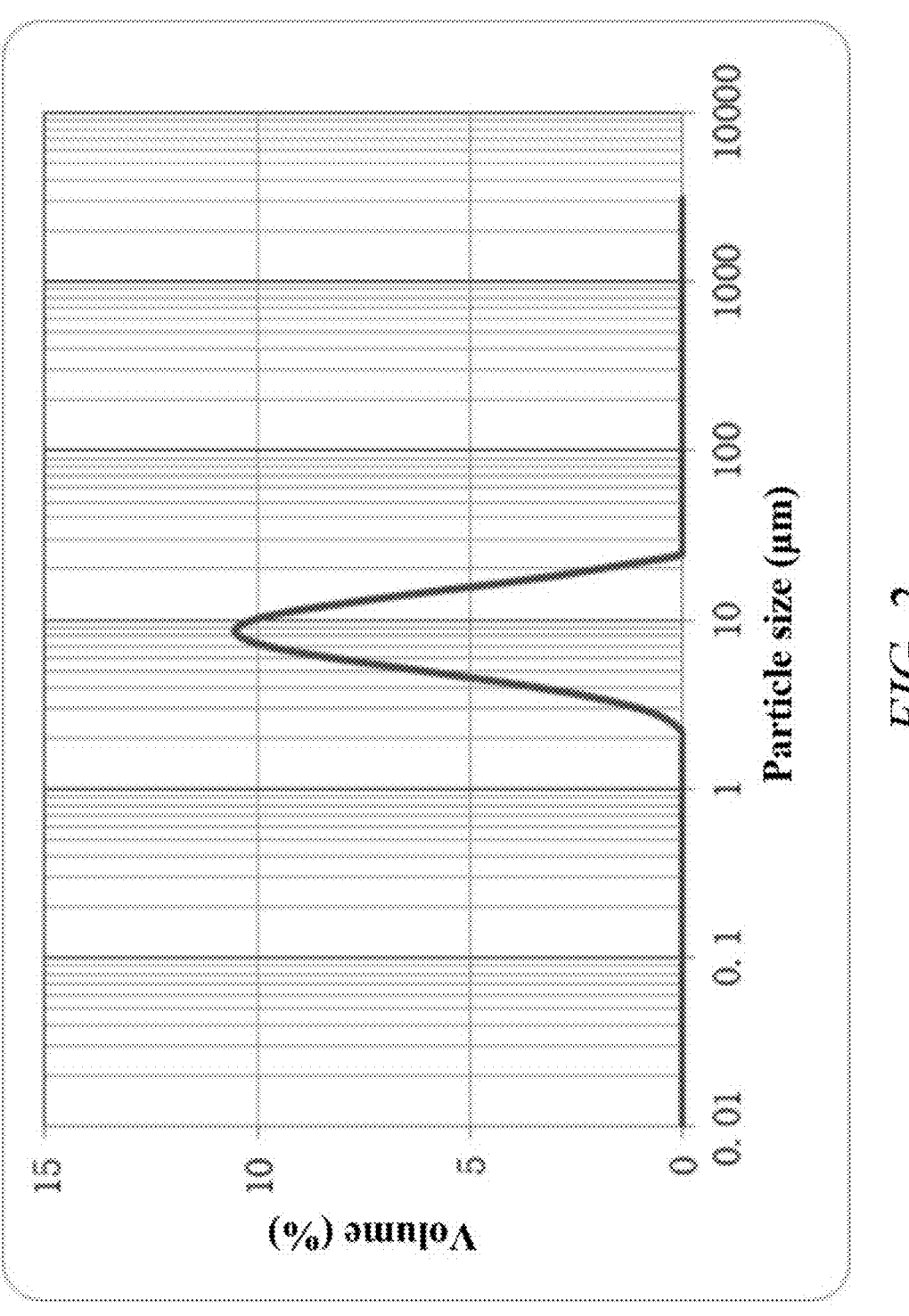
FIG. 2 is a volume-average particle size distribution diagram according to an embodiment of the present application.

An appropriate amount of a test sample was added into a clean beaker, and treated with 120 W ultrasound for 5 min to ensure that the sample was completely dispersed. The test instrument was US Malvern 2000. The sample was poured into a sample injection tower and circulated with the solution to a test light path system; and with the particles exposed to a laser beam, the scattered light was received and its energy distribution was measured to obtain the particle size distribution characteristics of the particles (shading degree: 8-12%). A particle size-volume distribution diagram was drawn from the test data (for example, FIG. 2 is a particle size-volume distribution diagram of a high-nickel active material of Example 1). It can be known from the distribution diagram that: if the diameter of the particles occupying 50% of the total volume is greater than a certain Dv50 value, and the diameter of other particles occupying 50% of the total volume is less than the Dv50 value, then the Dv50 value is the volumetric average particle size of the particles.

5. Test of Shell Layer Thickness

An ion polisher IB-19500 and a US FEI Tecanai G2 transmission electron microscope were used together. The tools for sample preparation were washed, a glue for sample preparation (a colloid formed by dispersing PVDF into NMP, with a mass content of PVDF of 8%) was uniformly mixed with the sample powder (the powder weight was about 5 times that of the glue), and the mixture was coated onto a copper foil and dried at 60° C. for 30 min. The prepared sample was cut with a pair of scissors into a size of 6 mm×6 mm, and the sample was fixed on a sample table and put into the ion polisher (model: IB-19500CP) for cutting. The cut sample was put into the US FEI Tecanai G2 transmission electron microscope for a test of shell layer thickness, so that the shell layer thickness of the particles could be tested.

The method for determining the above-mentioned relevant parameters in the comparative examples was the same as that in the examples.

[Test of Battery Performance]

1. Initial Discharge Capacity

The lithium-ion battery of the example was put into an oven at 25° C., and allowed to stand for 5 min before a charge/discharge test. A charge/discharge process was as follows: the battery was discharged to 2.8 V with a constant current of $\frac{1}{3}$ C, allowed to stand for 5 min, and charged to 4.25 V with a constant current of $\frac{1}{3}$ C, then charged to a current of ≤0.05 mA with a constant voltage of 4.25 V, allowed to stand for 5 min, and discharged to 2.8 V with a constant current of $\frac{1}{3}$ C; and the discharge capacity at this moment was the initial discharge capacity referred to in the present application.

2. Capacity Retention Rate During Cycling

At 25° C., the lithium-ion batteries of all examples and comparative examples were subjected to a charge/discharge test. A charge/discharge cycle process was as follows: The battery was charged to 4.25 V with a constant current of 1 C, charged to a current of ≤0.05 mA with a constant voltage of 4.25 V, allowed to stand for 5 min, and then discharged to 2.8 V with a constant current of 1 C, at which moment, the battery capacity was recorded as C1, forming a charge/discharge cycle of the battery. After 300 cycles of the above process, the battery capacity at this moment was recorded as C300. Then, the capacity retention rate during cycling=C300/C1×100%.

The capacity retention rates during cycling in the Tables 1 to 8 were all measured after 300 cycles.

3. Test of Expansion Performance at 70° C.

For the batteries (with nominal capacity of 2.25 Ah) in 100% SOC (State of Charge), the initial volume V0 of a single battery was measured at 70° C. with the drainage method, and the battery was taken out and stored in a storage furnace at 70° C. for 48 h; after the battery was cooled to room temperature, the battery volume V1 was measured again with the drainage method. The above steps were repeated. After 20 days of storage, the battery volume V10 was measured with the drainage method, and the expansion amount=(V10−V0)/2.25.

The expansion amounts in Tables 1 to 8 were all measured after 20 days of storage.

The method for determining the battery performance in the comparative examples was the same as that in the examples.

TABLE A

Process parameters of high-nickel active materials in examples and comparative examples

| | Step S1 | | | | | Step S2 |
| Serial No. | Sodium metaaluminate/g | Sodium silicate/g | NaOH solution/L | High-nickel ternary precursor/g | $CO_2$/(mL/min) | First intermediate/g |
| --- | --- | --- | --- | --- | --- | --- |
| C1 | / | / | / | / | / | 953.00[a] |
| C2 | / | / | / | / | / | 953.00 |
| C3 | 13.02 | 19.37 | 2.00 | 953.00 | 10.00 | 980.62 |
| E1 | 13.02 | 19.37 | 2.00 | 953.00 | 10.00 | 980.62 |
| E2 | 13.02 | 19.37 | 2.00 | 951.00 | 10.00 | 978.62 |
| E3 | 13.02 | 19.37 | 2.00 | 947.00 | 10.00 | 974.62 |
| E4 | 13.02 | 19.37 | 2.00 | 953.00 | 10.00 | 980.62 |

| | Step S2 | | | Step S3 | | |
| Serial No. | LiOH•H$_2$O/g | M precursor | Amount of M precursor/g | Second intermediate/g | R precursor | Amount of R precursor/g |
| --- | --- | --- | --- | --- | --- | --- |
| C1 | 472 | $TiO_2$ | 8.33 | / | / | / |
| C2 | 472 | $TiO_2$ | 8.33 | 1,000 | $B_2O_3$ | 3.18 |

TABLE A-continued

Process parameters of high-nickel active materials in examples and comparative examples

| | | | | | | |
|---|---|---|---|---|---|---|
| C3 | 472 | $TiO_2$ | 8.33 | / | / | / |
| E1 | 472 | $TiO_2$ | 8.33 | 1,000 | $B_2O_3$ | 3.18 |
| E2 | 472 | $TiO_2$ | 8.33 | 1,000 | $B_2O_3$ | 3.18 |
| E3 | 472 | $TiO_2$ | 8.33 | 1,000 | $B_2O_3$ | 3.18 |
| E4 | 472 | $B_2O_3$ | 15.91 | 1,000 | $B_2O_3$ | 1.89 |

Note:

1. Except the parameters listed in Table A, other preparation processes in the examples are the same as those in Example 1.

2. C1-C4 are Comparative examples 1-4, and E1-E4 are Examples 1-4, same below.

3. $^a$Since step S1 is not performed, the first intermediates in the Comparative examples C1 and C2 are high-nickel ternary precursors $(Ni_{0.9}Co_{0.05}Mn_{0.05})(OH)_2$.

TABLE 1

Product parameters of high-nickel active materials and performance of corresponding lithium-ion batteries in the examples and comparative examples

| | Core | | First shell layer | | Second shell layer | | |
|---|---|---|---|---|---|---|---|
| Serial No. | $Li_{1+\alpha}[Ni_xCo_y Mn_zM_b]O_2$ | Content of element M/ppm | $Li_\alpha Al_x Si_y O_4$ (value of X:Y) | Total mass content of elements silicon and aluminum in first shell layer/ppm | Transition layer $Li_p R_q O_w$ | Oxide of R | Content of element R/ppm |
| C1 | $Li_{1.0}[Ni_{0.891}Co_{0.0495} Mn_{0.0495}Ti_{0.01}]O_2$ | 5,000 | / | / | / | / | / |
| C2 | $Li_{1.0}[Ni_{0.891}Co_{0.0495} Mn_{0.0495}Ti_{0.01}]O_2$ | 5,000 | / | / | $LiBO_2$ | $B_2O_3$ | 1,000 |
| C3 | $Li_{1.0}[Ni_{0.891}Co_{0.0495} Mn_{0.0495}Ti_{0.01}]O_2$ | 5,000 | $LiAlSiO_4(1)$ | 8.734 | / | / | / |
| E1 | $Li_{1.0}[Ni_{0.891}Co_{0.0495} Mn_{0.0495}Ti_{0.01}]O_2$ | 5,000 | $LiAlSiO_4(1)$ | 8.734 | $LiBO_2$ | $B_2O_3$ | 1,000 |
| E2 | $Li_{1.0}[Ni_{0.891}Co_{0.0495} Mn_{0.0495}Ti_{0.01}]O_2$ | 5,000 | $LiAlSiO_4(1)$ | 8.734 | $LiBO_2$ | $B_2O_3$ | 1,000 |
| E3 | $Li_{1.0}[Ni_{0.891}Co_{0.04955} Mn_{0.049}Ti_{0.01}]O_2$ | 5,000 | $LiAlSiO_4(1)$ | 8.734 | $LiBO_2$ | $B_2O_3$ | 1,000 |
| E4 | $Li_{1.0}[Ni_{0.891}Co_{0.0495} Mn_{0.0495}Ti_{0.01}]O_2$ | 5,000 | $LiAlSiO_4(1)$ | 8.734 | $LiAlO_2$ | $B_2O_3$ | 1,000 |

Battery performance parameters

| Serial No. | Dv50/μm | Shell layer Thickness/μm | Mass ratio of element lithium in core layer and shell layer | Mass ratio of element silicon to element R | Initial discharge capacity/(mAh/g) | Expansion/(mL/Ah) | Surface impurity lithium amount/ppm | Capacity retention rate during cycling at 25° C./% |
|---|---|---|---|---|---|---|---|---|
| C1 | 9.0 | / | / | / | 196 | 28.2 | 3,287 | 86.5 |
| C2 | 9.0 | 0.03 | 5,803 | / | 208 | 12.5 | 2,356 | 92.3 |
| C3 | 9.0 | 0.38 | 86 | / | 206 | 14.6 | 2,576 | 91.3 |
| E1 | 9.0 | 0.45 | 70 | 4.4 | 216 | 6.8 | 1,502 | 96.1 |
| E2 | 9.0 | 0.42 | 69 | 4.4 | 200 | 5.4 | 1,298 | 97.1 |
| E3 | 9.0 | 0.44 | 72 | 4.4 | 189 | 4.5 | 976 | 97.8 |
| E4 | 9.0 | 0.44 | 71 | 4.4 | 214 | 6.5 | 1,482 | 96.3 |

Through comprehensive analysis of Examples E1-4 and Comparative examples C1-3 in Table 1, the surface impurity lithium amount and expansion amount of the lithium-ion batteries corresponding to Examples E1-4 are significantly lower than those in Comparative examples C1-3, that is, the lithium-ion batteries have a good discharge capacity, safety performance and cycle performance.

Through comparison between Comparative examples C1 and C2, the presence of the second shell layer can significantly improve the surface impurity lithium amount and battery expansion amount of the lithium-ion battery, thereby improving the safety performance and cycle performance of the battery; but the batteries in both comparative examples have a good discharge capacity.

Through comparison between Comparative examples C1 and C3, the presence of the first shell layer can significantly improve the surface impurity lithium amount of the positive electrode and the expansion amount inside the lithium-ion battery, thereby improving the safety performance and cycle performance of the battery; but the batteries in both comparative examples have a good discharge capacity.

TABLE B

Process parameters of high-nickel active materials in the examples

| | Step S1 | | | | | Step S2 |
|---|---|---|---|---|---|---|
| Serial No. | Sodium metaaluminate/g | Sodium silicate/g | NaOH solution/L | Nickel-containing ternary precursor/g | $CO_2$/ (mL/min) | First intermediate/g |
| E1 | 13.02 | 19.37 | 2.00 | 953.00 | 10.00 | 980.62 |
| E6 | 11.46 | 21.21 | 2.00 | 953.00 | 10.00 | 980.59 |
| E7 | 12.66 | 19.82 | 2.00 | 953.00 | 10.00 | 980.63 |
| E8 | 14.31 | 17.75 | 2.00 | 953.00 | 10.00 | 980.58 |
| E9 | 9.55 | 23.68 | 2.00 | 953.00 | 10.00 | 980.72 |
| E10 | 15.41 | 16.38 | 2.00 | 953.00 | 10.00 | 980.55 |

| | Step S2 | | | Step S3 | | |
|---|---|---|---|---|---|---|
| Serial No. | LiOH · $H_2O$/g | M precursor | M precursor/g | Second intermediate/g | R precursor | Amount of R precursor/g |
| E1 | 472 | $TiO_2$ | 8.33 | 1,000 | $B_2O_3$ | 3.18 |
| E6 | 472 | $TiO_2$ | 8.33 | 1,000 | $B_2O_3$ | 3.18 |
| E7 | 472 | $TiO_2$ | 8.33 | 1,000 | $B_2O_3$ | 3.18 |
| E8 | 472 | $TiO_2$ | 8.33 | 1,000 | $B_2O_3$ | 3.18 |
| E9 | 472 | $TiO_2$ | 8.33 | 1,000 | $B_2O_3$ | 3.18 |
| E10 | 472 | $TiO_2$ | 8.33 | 1,000 | $B_2O_3$ | 3.18 |

Note:
Except the parameters listed in Table B, other preparation processes in the examples are the same as those in Example 1.

TABLE 2

Product parameters of high-nickel active materials and performance of corresponding lithium-ion batteries in the examples

| | Core | | | Shell | | | |
|---|---|---|---|---|---|---|---|
| | | | | First shell layer | | | |
| | | | | Total mass content of elements | | | Second shell layer |
| Serial No. | $Li_{1+\alpha}[Ni_xCo_yMn_z M_b]O_2$ | Content of element M/ppm | $Li_\alpha Al_x Si_y O_4$ (Value of X:Y) | silicon and aluminum first shell layer/ppm | Transition layer $Li_p R_q O_w$ | Oxide of R | Content of element R/ppm |
| E1 | $Li_{1.0}[Ni_{0.89}Co_{0.0495} Mn_{0.0495}Ti_{0.01}]O_2$ | 5,000 | $LiAlSiO_4$(1) | 8,734 | $LiBO_2$ | $B_2O_3$ | 1,000 |
| E6 | $Li_{1.0}[Ni_{0.89}Co_{0.0495} Mn_{0.0495}Ti_{0.01}]O_2$ | 5,000 | $LiAl_{0.875}Si_{1.094}O_4$(0.8) | 8,667 | $LiBO_2$ | $B_2O_3$ | 1,000 |
| E7 | $Li_{1.0}[Ni_{0.89}Co_{0.0495} Mn_{0.0495}Ti_{0.01}]O_2$ | 5,000 | $LiAl_{0.971}Si_{1.022}O_4$(0.95) | 8,719 | $LiBO_2$ | $B_2O_3$ | 1,000 |
| E8 | $Li_{1.0}[Ni_{0.89}Co_{0.0495} Mn_{0.0495}Ti_{0.01}]O_2$ | 5,000 | $LiAl_{1.105}Si_{0.921}O_4$(1.2) | 8,806 | $LiBO_2$ | $B_2O_3$ | 1,000 |
| E9 | $Li_{1.0}[Ni_{0.89}Co_{0.0495} Mn_{0.0495}Ti_{0.01}]O_2$ | 5,000 | $LiAl_{0.724}Si_{1.207}O_4$ (0.6) | 8,584 | $LiBO_2$ | $B_2O_3$ | 1,000 |

TABLE 2-continued

Product parameters of high-nickel active materials and performance of corresponding lithium-ion batteries in the examples

| | | | | | Battery performance parameters | | | | |
|---|---|---|---|---|---|---|---|---|---|
| Serial No. | Dv50/μm | Shell layer thickness/ μm | Mass ratio of element lithium in core layer and shell layer | Mass ratio of element silicon to element R | Initial discharge capacity/ (mAh/g) | Ex- pan- sion/ (mL/ Ah) | Surface impurity lithium amount/ ppm | Capacity retention rate during cycling at 25° C./% |
| E1 | 9.0 | 0.45 | 70 | 4.4 | 216 | 6.8 | 1,502 | 96.1 |
| E6 | 9.0 | 0.44 | 71 | 4.89 | 215 | 6.7 | 1,456 | 96.3 |
| E7 | 9.0 | 0.42 | 70 | 4.55 | 216 | 6.6 | 1,543 | 96.2 |
| E8 | 9.0 | 0.43 | 69 | 4.07 | 217 | 6.8 | 1,432 | 96.2 |
| E9 | 9.0 | 0.46 | 71 | 4.15 | 212 | 7.2 | 1,657 | 94.5 |

Through comprehensive analysis of Example 1 and Examples 6-10 in Table 2, when the value of X:Y is 0.8 to 1.2, the surface impurity lithium amount of the positive electrode and the expansion amount inside the lithium-ion battery are improved, and the lithium-ion battery has a good discharge capacity, safety performance and cycle performance.

TABLE C

Process parameters of high-nickel active materials in the examples

| | Step S1 | | | | | Step S2 |
|---|---|---|---|---|---|---|
| Serial No. | Sodium metaaluminate/g | Sodium silicate/g | NaOH solution/L | Nickel- containing ternary precursor/g | $CO_2$/ (mL/min) | First intermediate/g |
| E1 | 13.02 | 19.37 | 2.00 | 953.00 | 10.00 | 980.62 |
| E11 | 19.52 | 29.05 | 2.00 | 953.00 | 10.00 | 994.43 |
| E12 | 1.69 | 2.52 | 2.00 | 953.00 | 10.00 | 956.59 |
| E13 | 0.65 | 0.97 | 2.00 | 953.00 | 10.00 | 954.38 |
| E14 | 26.03 | 38.73 | 2.00 | 953.00 | 10.00 | 1008.24 |
| E15 | 0.07 | 0.10 | 2.00 | 953.00 | 10.00 | 953.14 |

| | Step S2 | | Amount of | Step S3 | | |
|---|---|---|---|---|---|---|
| Serial No. | LiOH · $H_2O$/g | M precursor | M precursor/g | Second intermediate/g | R precursor | Amount of R precursor/g |
| E1 | 472 | $TiO_2$ | 8.33 | 1,000 | $B_2O_3$ | 3.18 |
| E11 | 472 | $TiO_2$ | 8.33 | 1,000 | $B_2O_3$ | 63.64 |
| E12 | 472 | $TiO_2$ | 8.33 | 1,000 | $B_2O_3$ | 3.18 |
| E13 | 472 | $TiO_2$ | 8.33 | 1,000 | $B_2O_3$ | 0.32 |
| E14 | 472 | $TiO_2$ | 8.33 | 1,000 | $B_2O_3$ | 3.18 |
| E15 | 472 | $TiO_2$ | 8.33 | 1,000 | $B_2O_3$ | 3.18 |

Note:

Except the parameters listed in Table C, other preparation processes in the examples are the same as those in Example 1.

TABLE 3

Product parameters of high-nickel active materials and performance of corresponding lithium-ion batteries in the examples

| | Core | | First shell layer | Total mass content of elements | | Second shell layer | |
|---|---|---|---|---|---|---|---|
| Serial No. | $Li_{1+\alpha}[Ni_xCo_yMn_z M_b]O_2$ | Content of element M/ppm | $Li_{\alpha}Al_xSi_yO_4$ (Value of X:Y) | silicon and aluminum first shell layer/ppm | Transition layer $Li_pR_qO_w$ | Oxide of R | Content of element R/ppm |
| E1 | $Li_{1.0}[Ni_{0.891}Co_{0.0495}Mn_{0.0495}Ti_{0.01}]O_2$ | 5,000 | $LiAlSiO_4(1)$ | 8,734 | $LiBO_2$ | $B_2O_3$ | 1,000 |
| E11 | $Li_{1.0}[Ni_{0.891}Co_{0.0495}Mn_{0.0495}Ti_{0.01}]O_2$ | 5,000 | $LiAlSiO_4(1)$ | 13,101 | $LiBO_2$ | $B_2O_3$ | 1,000 |
| E12 | $Li_{1.0}[Ni_{0.891}Co_{0.0495}Mn_{0.0495}Ti_{0.01}]O_2$ | 5,000 | $LiAlSiO_4(1)$ | 1,135 | $LiBO_2$ | $B_2O_3$ | 1,000 |
| E13 | $Li_{1.0}[Ni_{0.891}Co_{0.0495}Mn_{0.0495}Ti_{0.01}]O_2$ | 5,000 | $LiAlSiO_4(1)$ | 437 | $LiBO_2$ | $B_2O_3$ | 1,000 |
| E14 | $Li_{1.0}[Ni_{0.891}Co_{0.0495}Mn_{0.0495}Ti_{0.01}]O_2$ | 5,000 | $LiAlSiO_4(1)$ | 17,469 | $LiBO_2$ | $B_2O_3$ | 1,000 |
| E15 | $Li_{1.0}[Ni_{0.891}Co_{0.0495}Mn_{0.0495}Ti_{0.01}]O_2$ | 5,000 | $LiAlSiO_4(1)$ | 44 | $LiBO_2$ | $B_2O_3$ | 1,000 |

| | | | | Battery performance parameters | | | |
|---|---|---|---|---|---|---|---|
| Serial No. | Dv50/μm | Shell layer thickness/μm | Mass ratio of element lithium in core layer and shell layer | Mass ratio of element silicon to element R | Initial discharge capacity/(mAh/g) | Expansion/(mL/Ah) | Surface impurity lithium amount/ppm | Capacity retention rate during cycling at 25° C./% |
| E1 | 9.0 | 0.45 | 70 | 4.4 | 216 | 6.8 | 1,502 | 96.1 |
| E11 | 9.0 | 0.96 | 40 | 0.33 | 213 | 5.8 | 1,452 | 96.3 |
| E12 | 9.0 | 0.17 | 500 | 0.57 | 215 | 7.3 | 1,523 | 96.2 |
| E13 | 9.0 | 0.04 | 1,300 | 2.2 | 214 | 7.6 | 1,587 | 95.5 |
| E14 | 9.0 | 0.84 | 32 | 8.8 | 198 | 7.8 | 1,520 | 93.8 |
| E15 | 9.0 | 0.06 | 4,806 | 0.022 | 210 | 13.9 | 2,108 | 92.8 |

Through comprehensive analysis of Example 1, Examples 11-13 and Examples 14-15 in Table 3, in the high-nickel positive electrode active material, when a mass ratio of element lithium in the core to element lithium in the shell layer is 40 to 1,300:1, the surface impurity lithium amount of the positive electrode and the expansion amount inside the lithium-ion battery are improved, and the lithium-ion battery has a good discharge capacity, safety performance and cycle performance.

TABLE D

Process parameters of high-nickel active materials in the examples

| | Step S1 | | | | | Step S2 |
|---|---|---|---|---|---|---|
| Serial No. | Sodium metaaluminate/g | Sodium silicate/g | NaOH solution/L | Nickel-containing ternary precursor/g | $CO_2/$(mL/min) | First intermediate/g |
| E1 | 13.02 | 19.37 | 2.00 | 953.00 | 10.00 | 980.62 |
| E16 | 13.02 | 19.37 | 2.00 | 953.00 | 10.00 | 980.62 |
| E17 | 13.02 | 19.37 | 2.00 | 953.00 | 10.00 | 980.62 |
| E18 | 13.02 | 19.37 | 2.00 | 953.00 | 10.00 | 980.62 |
| E19 | 13.02 | 19.37 | 2.00 | 953.00 | 10.00 | 980.62 |

| | Step S2 | | Amount of | | Step S3 | |
|---|---|---|---|---|---|---|
| Serial No. | $LiOH \cdot H_2O/g$ | M precursor | M precursor/g | Second intermediate/g | R precursor | Amount of R precursor/g |
| E1 | 472 | $TiO_2$ | 8.33 | 1,000 | $B_2O_3$ | 3.18 |
| E16 | 472 | $TiO_2$ | 1.67 | 1,000 | $B_2O_3$ | 3.18 |

TABLE D-continued

| Process parameters of high-nickel active materials in the examples | | | | | | |
|---|---|---|---|---|---|---|
| E17 | 472 | $TiO_2$ | 5.00 | 1,000 | $B_2O_3$ | 3.18 |
| E18 | 472 | $TiO_2$ | 0.17 | 1,000 | $B_2O_3$ | 3.18 |
| E19 | 472 | $TiO_2$ | 10.00 | 1,000 | $B_2O_3$ | 3.18 |

Note:
Except the parameters listed in Table D, other preparation processes in the examples are the same as those in Example 1.

TABLE 4

Product parameters of high-nickel active materials and performance of corresponding lithium-ion batteries in the examples

| | Core | | | Shell | | | |
|---|---|---|---|---|---|---|---|
| | | | | First shell layer | | | |
| | | | | Total mass content of elements silicon and aluminum | Transition | Second shell layer | |
| Serial No. | $Li_{1+\alpha}[Ni_xCo_yMn_zM_b]O_2$ | Content of element M/ppm | $Li_\alpha Al_x Si_y O_4$ (Value of X:Y) | first shell layer/ppm | layer $Li_p R_q O_w$ | Oxide of R | Content of element R/ppm |
| E1 | $Li_{1.0}[Ni_{0.891}Co_{0.0495}Mn_{0.0495}Ti_{0.01}]O_2$ | 5,000 | $LiAlSiO_4$(1) | 8,734 | $LiBO_2$ | $B_2O_3$ | 1,000 |
| E16 | $Li_{1.0}[Ni_{0.891}Co_{0.0495}Mn_{0.0495}Ti_{0.01}]O_2$ | 1,000 | $LiAlSiO_4$(1) | 8,734 | $LiBO_2$ | $B_2O_3$ | 1,000 |
| E17 | $Li_{1.0}[Ni_{0.891}Co_{0.0495}Mn_{0.0495}Ti_{0.01}]O_2$ | 3,000 | $LiAlSiO_4$(1) | 8,734 | $LiBO_2$ | $B_2O_3$ | 1,000 |
| E18 | $Li_{1.0}[Ni_{0.891}Co_{0.0495}Mn_{0.0495}Ti_{0.01}]O_2$ | 100 | $LiAlSiO_4$(1) | 8,734 | $LiBO_2$ | $B_2O_3$ | 1,000 |
| E19 | $Li_{1.0}[Ni_{0.891}Co_{0.0495}Mn_{0.0495}Ti_{0.01}]O_2$ | 6,000 | $LiAlSiO_4$(1) | 8,734 | $LiBO_2$ | $B_2O_3$ | 1,000 |

| | | Mass ratio | | Battery performance parameters | | | |
|---|---|---|---|---|---|---|---|
| Serial No. | Dv50/μm | Shell layer thickness/μm | of element lithium in core layer and shell layer | Mass ratio of element silicon to element R | Initial discharge capacity/(mAh/g) | Expansion/(mL/Ah) | Surface impurity lithium amount/ppm | Capacity retention rate during cycling at 25° C./% |
| E1 | 9.0 | 0.45 | 70 | 4.4 | 216 | 6.8 | 1,502 | 96.1 |
| E16 | 9.0 | 0.45 | 70 | 4.4 | 218 | 7.1 | 1,622 | 95.6 |
| E17 | 9.0 | 0.45 | 70 | 4.4 | 217 | 6.5 | 1,567 | 95.8 |
| E18 | 9.0 | 0.45 | 70 | 4.4 | 219 | 8.2 | 1,890 | 92.5 |
| E19 | 9.0 | 0.45 | 70 | 4.4 | 212 | 7.8 | 1,820 | 93.4 |

Through comprehensive analysis of Example 1, Examples 16-17 and Examples 18-19 in Table 4, based on the total mass of the high-nickel positive electrode active material, when the mass content of the element M in the high-nickel positive electrode active material is 1,000 to 5,000 ppm, the surface impurity lithium amount of the positive electrode and the expansion amount inside the lithium-ion battery are improved, and the lithium-ion battery has a good discharge capacity, safety performance and cycle performance.

TABLE E

Process parameters of high-nickel active materials in the examples

| | Step S1 | | | | | Step S2 |
|---|---|---|---|---|---|---|
| Serial No. | Sodium metaaluminate/g | Sodium silicate/g | NaOH solution/L | Nickel-containing ternary precursor/g | $CO_2$/(mL/min) | First intermediate/g |
| E1 | 13.02 | 19.37 | 2.00 | 953.00 | 10.00 | 980.62 |
| E20 | 0.65 | 0.97 | 2.00 | 953.00 | 10.00 | 954.38 |
| E21 | 19.52 | 29.05 | 2.00 | 953.00 | 10.00 | 994.43 |

TABLE E-continued

Process parameters of high-nickel active materials in the examples

| | | | | | |
|---|---|---|---|---|---|
| E22 | 26.03 | 38.73 | 2.00 | 953.00 | 10.00 | 1008.24 |
| E23 | 0.07 | 0.10 | 2.00 | 953.00 | 10.00 | 953.14 |

| | Step S2 | | Amount of | Step S3 | | |
|---|---|---|---|---|---|---|
| Serial No. | LiOH·H$_2$O/g | M precursor | M precursor/g | Second intermediate/g | R precursor | Amount of R precursor/g |
| E1 | 472 | TiO$_2$ | 8.33 | 1,000 | B$_2$O$_3$ | 3.18 |
| E20 | 472 | TiO$_2$ | 8.33 | 1,000 | B$_2$O$_3$ | 3.18 |
| E21 | 472 | TiO$_2$ | 8.33 | 1,000 | B$_2$O$_3$ | 3.18 |
| E22 | 472 | TiO$_2$ | 8.33 | 1,000 | B$_2$O$_3$ | 3.18 |
| E23 | 472 | TiO$_2$ | 8.33 | 1,000 | B$_2$O$_3$ | 3.18 |

Note:
Except the parameters listed in Table E, other preparation processes in the examples are the same as those in Example 1.

TABLE 5

Product parameters of high-nickel active materials and performance of corresponding lithium-ion batteries in the examples

| | Core | | First shell layer | Shell | | Second shell layer | |
|---|---|---|---|---|---|---|---|
| Serial No. | Li$_{1+\alpha}$[Ni$_x$Co$_y$Mn$_z$ M$_b$]O$_2$ | Content of element M/ppm | Li$_\alpha$Al$_x$Si$_y$O$_4$ (Value of X:Y) | Total mass content of elements silicon and aluminum first shell layer/ppm | Transition layer Li$_p$R$_q$O$_w$ | Oxide of R | Content of element R/ppm |
| E1 | Li$_{1.0}$[Ni$_{0.891}$Co$_{0.0495}$Mn$_{0.0495}$Ti$_{0.01}$]O$_2$ | 5,000 | LiAlSiO$_4$(1) | 8,734 | LiBO$_2$ | B$_2$O$_3$ | 1,000 |
| E20 | Li$_{1.0}$[Ni$_{0.891}$Co$_{0.0495}$Mn$_{0.0495}$Ti$_{0.01}$]O$_2$ | 1,000 | LiAlSiO$_4$(1) | 437 | LiBO$_2$ | B$_2$O$_3$ | 1,000 |
| E21 | Li$_{1.0}$[Ni$_{0.891}$Co$_{0.0495}$Mn$_{0.0495}$Ti$_{0.01}$]O$_2$ | 3,000 | LiAlSiO$_4$(1) | 13,101 | LiBO$_2$ | B$_2$O$_3$ | 1,000 |
| E22 | Li$_{1.0}$[Ni$_{0.891}$Co$_{0.0495}$Mn$_{0.0495}$Ti$_{0.01}$]O$_2$ | 100 | LiAlSiO$_4$(1) | 17,469 | LiBO$_2$ | B$_2$O$_3$ | 1,000 |
| E23 | Li$_{1.0}$[Ni$_{0.891}$Co$_{0.0495}$Mn$_{0.0495}$Ti$_{0.01}$]O$_2$ | 6,000 | LiAlSiO$_4$(1) | 444 | LiBO$_2$ | B$_2$O$_3$ | 1,000 |

| Serial No. | Dv50/μm | Shell layer thickness/μm | Mass ratio of element lithium in core layer and shell layer | Mass ratio of element silicon to element R | Battery performance parameters | | | |
|---|---|---|---|---|---|---|---|---|
| | | | | | Initial discharge capacity/(mAh/g) | Expansion/(mL/Ah) | Surface impurity lithium amount/ppm | Capacity retention rate during cycling at 25° C./% |
| E1 | 9.0 | 0.45 | 70 | 4.4 | 216 | 6.8 | 1,502 | 96.1 |
| E20 | 9.0 | 0.1 | 867 | 0.22 | 216 | 7.3 | 1,567 | 95.5 |
| E21 | 9.0 | 0.65 | 56 | 6.6 | 214 | 6.6 | 1453 | 96.4 |
| E22 | 9.0 | 0.84 | 32 | 8.8 | 198 | 7.8 | 1,520 | 93.8 |
| E23 | 9.0 | 0.06 | 4,806 | 0.022 | 210 | 13.9 | 2,108 | 92.8 |

Through comprehensive analysis of Example 1, Examples 20-21 and Examples 22-23 in Table 5, based on the total mass of the high-nickel positive electrode active material, when the total mass content of the elements silicon and aluminum in the first shell layer of the high-nickel positive electrode active material is 435 to 13,150 ppm, the surface impurity lithium amount of the positive electrode and the expansion amount inside the lithium-ion battery are improved, and the lithium-ion battery has a good discharge capacity, safety performance and cycle performance.

TABLE F

Process parameters of high-nickel active materials in the examples

| Serial No. | Step S1 Sodium metaaluminate/g | Sodium silicate/g | NaOH solution/L | Nickel-containing ternary precursor/g | $CO_2$/(mL/min) | Step S2 First intermediate/g |
|---|---|---|---|---|---|---|
| E24 | 19.52 | 29.05 | 2.00 | 953.00 | 10.00 | 994.43 |
| E25 | 1.95 | 2.90 | 2.00 | 953.00 | 10.00 | 957.14 |
| E26 | 19.52 | 29.05 | 2.00 | 953.00 | 10.00 | 994.43 |
| E27 | 1.95 | 2.90 | 2.00 | 953.00 | 10.00 | 957.14 |
| E28 | 19.52 | 29.05 | 2.00 | 953.00 | 10.00 | 994.43 |

| Serial No. | Step S2 LiOH·$H_2O$/g | M precursor | M precursor/g | Amount of Second intermediate/g | Step S3 R precursor | Amount of R precursor/g |
|---|---|---|---|---|---|---|
| E24 | 472 | $TiO_2$ | 8.33 | 1,000 | $Co(OH)_2$ | 31.53 |
| E25 | 472 | $TiO_2$ | 8.33 | 1,000 | $Co(OH)_2$ | 0.16 |
| E26 | 472 | $TiO_2$ | 8.33 | 1,000 | $Co(OH)_2$ | 15.76 |
| E27 | 472 | $TiO_2$ | 8.33 | 1,000 | $Co(OH)_2$ | 0.02 |
| E28 | 472 | $TiO_2$ | 8.33 | 1,000 | $Co(OH)_2$ | 55.17 |

Note:

Except the parameters listed in Table F, other preparation processes in the examples are the same as those in Example 1.

TABLE 6

Product parameters of high-nickel active materials and performance of corresponding lithium-ion batteries in the examples

| Serial No. | Core $Li_{1+\alpha}[Ni_xCo_yMn_zM_b]O_2$ | Content of element M/ppm | First shell layer $Li_\alpha Al_x Si_y O_4$ (Value of X:Y) | Total mass content of elements silicon and aluminum first shell layer/ppm | Transition layer $Li_pR_qO_w$ | Second shell layer Oxide of R | Content of element R/ppm |
|---|---|---|---|---|---|---|---|
| E1 | $Li_{1.0}[Ni_{0.891}Co_{0.0495}Mn_{0.0495}Ti_{0.01}]O_2$ | 5,000 | $LiAlSiO_4$(1) | 8,734 | $LiBO_2$ | $B_2O_3$ | 1,000 |
| E24 | $Li_{1.0}[Ni_{0.891}Co_{0.0495}Mn_{0.0495}Ti_{0.01}]O_2$ | 5,000 | $LiAlSiO_4$(1) | 13,101 | $LiCoO_2$ | $Co(OH)_2$ | 20,000 |
| E25 | $Li_{1.0}[Ni_{0.891}Co_{0.0495}Mn_{0.0495}Ti_{0.01}]O_2$ | 5,000 | $LiAlSiO_4$(1) | 1,310 | $LiCoO_2$ | $Co(OH)_2$ | 100 |
| E26 | $Li_{1.0}[Ni_{0.891}Co_{0.0495}Mn_{0.0495}Ti_{0.01}]O_2$ | 5,000 | $LiAlSiO_4$(1) | 13,101 | $LiCoO_2$ | $Co(OH)_2$ | 10,000 |
| E27 | $Li_{1.0}[Ni_{0.891}Co_{0.0495}Mn_{0.0495}Ti_{0.01}]O_2$ | 5,000 | $LiAlSiO_4$(1) | 1,310 | $LiCoO_2$ | $Co(OH)_2$ | 10 |
| E28 | $Li_{1.0}[Ni_{0.891}Co_{0.0495}Mn_{0.0495}Ti_{0.01}]O_2$ | 5,000 | $LiAlSiO_4$(1) | 13,101 | $LiCoO_2$ | $Co(OH)_2$ | 35,000 |

| Serial No. | Dv50/μm | Shell layer thickness/μm | Mass ratio of element lithium in core layer and shell layer | Mass ratio of element silicon to element R | Battery performance parameters Initial discharge capacity/(mAh/g) | Expansion/(mL/Ah) | Surface impurity lithium amount/ppm | Capacity retention rate during cycling at 25° C./% |
|---|---|---|---|---|---|---|---|---|
| E1 | 9.0 | 0.45 | 70 | 4.4 | 216 | 6.8 | 1,502 | 96.1 |
| E24 | 9.0 | 0.96 | 40 | 0.33 | 213 | 5.8 | 1,452 | 96.3 |
| E25 | 9.0 | 0.18 | 287 | 0.66 | 215 | 7.5 | 1,675 | 95.8 |

TABLE 6-continued

Product parameters of high-nickel active materials and performance of corresponding lithium-ion batteries in the examples

| | | | | | | | | |
|---|---|---|---|---|---|---|---|---|
| E26 | 9.0 | 0.79 | 48 | 0.66 | 214 | 6.1 | 1,546 | 96.5 |
| E27 | 9.0 | 0.17 | 311 | 66.6 | 208 | 15.9 | 2,398 | 91 |
| E28 | 9.0 | 1.2 | 34 | 0.19 | 205 | 5.4 | 1,561 | 92.1 |

Through comprehensive analysis of Example 1, Examples 24-26 and Examples 27-28 in Table 6, based on the total mass of the high-nickel positive electrode active material, when the mass content of the element R in the high-nickel positive electrode active material is 100 to 20,000 ppm, the surface impurity lithium amount of the positive electrode and the expansion amount inside the lithium-ion battery are improved, and the lithium-ion battery has a good discharge capacity, safety performance and cycle performance.

TABLE G

Process parameters of high-nickel active materials in the examples

| | Step S1 | | | | | Step S2 |
|---|---|---|---|---|---|---|
| Serial No. | Sodium metaaluminate/g | Sodium silicate/g | NaOH solution/L | Nickel-containing ternary precursor/g | $CO_2/$ (mL/min) | First intermediate/g |
| E1 | 13.02 | 19.37 | 2.00 | 953.00 | 10.00 | 980.62 |
| E29 | 0.88 | 1.31 | 2.00 | 953.00 | 10.00 | 954.87 |
| E30 | 11.73 | 17.45 | 2.00 | 953.00 | 10.00 | 977.88 |
| E31 | 10.26 | 15.26 | 2.00 | 953.00 | 10.00 | 974.77 |
| E32 | 26.03 | 38.73 | 2.00 | 953.00 | 10.00 | 1008.24 |
| E33 | 0.07 | 0.10 | 2.00 | 953.00 | 10.00 | 953.14 |

| | Step S2 | | | | Step S3 | |
|---|---|---|---|---|---|---|
| Serial No. | LiOH · H$_2$O/g | M precursor | M precursor/g | Second intermediate/g | R precursor | Amount of R precursor/g |
| E1 | 472 | TiO$_2$ | 8.33 | 1,000 | B$_2$O$_3$ | 3.18 |
| E29 | 472 | TiO$_2$ | 8.33 | 1,000 | B$_2$O$_3$ | 9.55 |
| E30 | 472 | TiO$_2$ | 8.33 | 1,000 | B$_2$O$_3$ | 3.18 |
| E31 | 472 | TiO$_2$ | 8.33 | 1,000 | B$_2$O$_3$ | 1.59 |
| E32 | 472 | TiO$_2$ | 8.33 | 1,000 | B$_2$O$_3$ | 3.18 |
| E33 | 472 | TiO$_2$ | 8.33 | 1,000 | B$_2$O$_3$ | 3.18 |

Note:
Except the parameters listed in Table G, other preparation processes in the examples are the same as those in Example 1.

TABLE 7

Product parameters of high-nickel active materials and performance of corresponding lithium-ion batteries in the examples

| | Core | | | Shell | | | |
|---|---|---|---|---|---|---|---|
| | | | | First shell layer | | Second shell layer | |
| Serial No. | $Li_{1+\alpha}[Ni_xCo_yMn_z M_b]O_2$ | Content of element M/ppm | $Li_\alpha Al_x Si_y O_4$ (Value of X:Y) | Total mass content of elements silicon and aluminum first shell layer/ppm | Transition layer $Li_p R_q O_w$ | Oxide of R | Content of element R/ppm |
| E1 | $Li_{1.0}[Ni_{0.891}Co_{0.0495} Mn_{0.0495}Ti_{0.01}]O_2$ | 5,000 | LiAlSiO$_4$(1) | 8,734 | LiBO$_2$ | B$_2$O$_3$ | 1,000 |
| E29 | $Li_{1.0}[Ni_{0.891}Co_{0.0495} Mn_{0.0495}Ti_{0.01}]O_2$ | 5,000 | LiAlSiO$_4$(1) | 590 | LiBO$_2$ | B$_2$O$_3$ | 3,000 |

TABLE 7-continued

Product parameters of high-nickel active materials and performance of corresponding lithium-ion batteries in the examples

| E30 | $Li_{1.0}[Ni_{0.891}Co_{0.0495}Mn_{0.0495}Ti_{0.01}]O_2$ | 5,000 | $LiAlSiO_4(1)$ | 7,869 | $LiBO_2$ | $B_2O_3$ | 1,000 |
| E31 | $Li_{1.0}[Ni_{0.891}Co_{0.0495}Mn_{0.0495}Ti_{0.01}]O_2$ | 5,000 | $LiAlSiO_4(1)$ | 6,885 | $LiBO_2$ | $B_2O_3$ | 500 |
| E32 | $Li_{1.0}[Ni_{0.891}Co_{0.0495}Mn_{0.0495}Ti_{0.01}]O_2$ | 5,000 | $LiAlSiO_4(1)$ | 17,469 | $LiBO_2$ | | 1,000 |
| E33 | $Li_{1.0}[Ni_{0.891}Co_{0.0495}Mn_{0.0495}Ti_{0.01}]O_2$ | 5,000 | $LiAlSiO_4(1)$ | 44 | $LiBO_2$ | $B_2O_3$ | 1,000 |

| Serial No. | Dv50/μm | Mass ratio of element Shell layer thickness/ μm | Mass ratio of lithium in core layer and shell layer | element silicon to element R | Battery performance parameters | | | |
| | | | | | Initial discharge capacity/ (mAh/ g) | Expansion/ (mL/ Ah) | Capacity retention Surface impurity lithium amount/ ppm | rate during cycling at 25° C./% |
| --- | --- | --- | --- | --- | --- | --- | --- | --- |
| E1 | 9.0 | 0.45 | 70 | 4.4 | 216 | 6.8 | 1,502 | 96.1 |
| E29 | 9.0 | 0.21 | 625 | 0.1 | 213 | 7.3 | 1,568 | 96.5 |
| E30 | 9.0 | 0.41 | 86 | 4 | 217 | 6.9 | 1,546 | 95.8 |
| E31 | 9.0 | 0.37 | 103 | 7 | 214 | 7.5 | 1,659 | 95.6 |
| E32 | 9.0 | 0.84 | 32 | 8.8 | 198 | 7.8 | 1,520 | 93.8 |
| E33 | 9.0 | 0.06 | 4,806 | 0.022 | 210 | 13.9 | 2,108 | 92.8 |

It can be seen from Example 1, Examples 29-31 and Examples 32-33 in Table 7 that, when a mass ratio of the element Si to the element R is 0.1 to 7.0:1, and particularly 0.1 to 4.4:1, the surface impurity lithium amount of the positive electrode is reduced, the expansion amount inside the battery is improved, and the discharge capacity, safety performance and cycle performance are further improved.

TABLE H

Process parameters of high-nickel active materials in the examples

| | Step S1 | | | | | Step S2 |
| Serial No. | Sodium metaaluminate/g | Sodium silicate/g | NaOH solution/L | Nickel-containing ternary precursor/g | $CO_2$/ (mL/min) | First intermediate/g |
| --- | --- | --- | --- | --- | --- | --- |
| E1 | 13.02 | 19.37 | 2.00 | 953.00 | 10.00 | 980.62 |
| E34 | 13.02 | 19.37 | 2.00 | 953.00 | 10.00 | 980.62 |
| E35 | 13.02 | 19.37 | 2.00 | 953.00 | 10.00 | 980.62 |

| | Step S2 | | | Step S3 | |
| Serial No. | $LiOH \cdot H_2O$/g | M precursor | Amount of M precursor/g | Second intermediate/g | R precursor | Amount of R precursor/g |
| --- | --- | --- | --- | --- | --- | --- |
| E1 | 472 | $TiO_2$ | 8.33 | 1,000 | $B_2O_3$ | 3.18 |
| E34 | 472 | $TiO_2$ | 8.33 | 1,000 | $B_2O_3$ | 3.18 |
| E35 | 472 | $TiO_2$ | 8.33 | 1,000 | $B_2O_3$ | 3.18 |

Note:

Except the parameters listed in Table H, other preparation processes in the examples are the same as those in Example 1.

TABLE 8

Product parameters of high-nickel active materials and performance of corresponding lithium-ion batteries in the examples

| | | | First shell layer | | Transition | Second shell layer | |
| Serial No. | Core $Li_{1+\alpha}[Ni_xCo_yMn_z M_b]O_2$ | Content of element M/ppm | $Li_\alpha Al_xSi_yO_4$ (Value of X:Y) | Total mass content of elements silicon and aluminum first shell layer/ppm | layer $Li_pR_qO_w$ | Oxide of R | Content of element R/ppm |
|---|---|---|---|---|---|---|---|
| E1 | $Li_{1.0}[Ni_{0.891}Co_{0.0495}Mn_{0.0495}Ti_{0.01}]O_2$ | 5,000 | $LiAlSiO_4$(1) | 8,734 | $LiBO_2$ | $B_2O_3$ | 1,000 |
| E34 | $Li_{1.0}[Ni_{0.891}Co_{0.0495}Mn_{0.0495}Ti_{0.01}]O_2$ | 5,000 | $LiAlSiO_4$(1) | 2,184 | $LiBO_2$ | $B_2O_3$ | 1,000 |
| E35 | $Li_{1.0}[Ni_{0.891}Co_{0.0495}Mn_{0.0495}Ti_{0.01}]O_2$ | 5,000 | $LiAlSiO_4$(1) | 2,184 | $LiBO_2$ | $B_2O_3$ | 1,000 |

| | | | | | Battery performance parameters | | | |
| Serial No. | Dv50/µm | Shell layer thickness/ µm | Mass ratio of element lithium in core layer and shell layer | Mass ratio of element silicon to element R | Initial discharge capacity/ (mAh/ g) | Expansion/ (mL/ Ah) | Surface impurity lithium amount/ ppm | Capacity retention rate during cycling at 25° C./% |
|---|---|---|---|---|---|---|---|---|
| E1 | 9.0 | 0.45 | 70 | 4.4 | 216 | 6.8 | 1,502 | 96.1 |
| E34 | 1.5 | 1.4 | 68 | 4.4 | 202 | 5.6 | 2,356 | 89.2 |
| E35 | 20 | 0.22 | 72 | 4.4 | 208 | 7.9 | 1,790 | 93.1 |

Through comprehensive analysis of Example 1 and Examples 34-35 in Table 8, when the volume-average particle size Dv50 of the high-nickel positive electrode active material is 1.5 to 20 m and the shell layer thickness is 0.001 to 1 m, the surface impurity lithium amount of the positive electrode and the expansion amount inside the lithium-ion battery are improved, and the lithium-ion battery has a good discharge capacity, safety performance and cycle performance.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

What is claimed is:

1. A high-nickel positive electrode active material with a core-shell structure, wherein the core comprises $Li_{1+a}[Ni_xCo_yMn_z M_b]O_2$, wherein $0.6 \leq x < 1$, $0 < y < 0.3$, $0 < z < 0.3$, $0 \leq a < 0.2$, $0 < b < 0.2$, $x+y+z+b=1$, M being Sb;

the shell comprises a first shell layer coating the core, a second shell layer coating the first shell layer, and a transition layer formed between the first shell layer and the second shell layer; wherein the first shell layer is a fast ionic conductor consisting of four elements of lithium, aluminum, silicon and oxygen;

the second shell layer comprises an oxide of an element R, the element R being selected from at least one of B, Ti, P, or La; and the transition layer comprises $LiBO_2$.

2. The high-nickel positive electrode active material according to claim 1, wherein the fast ionic conductor of the first shell layer is $Li_\alpha Al_xSi_yO_4$, wherein $0 < X < 2.4$, $0 < Y < 1.8$, $0.8 \leq \alpha \leq 1.2$, and a ratio of the stoichiometric coefficient X of the element aluminum to the stoichiometric coefficient Y of the element silicon is 0.8 to 1.2.

3. The high-nickel positive electrode active material according to claim 1, wherein the x is $0.8 \leq x < 1$.

4. The high-nickel positive electrode active material according to claim 1, wherein a mass ratio of the element lithium in the core to the element lithium in the shell is (40 to 1,300):1.

5. The high-nickel positive electrode active material according to claim 1, wherein based on a total mass of the high-nickel positive electrode active material, a mass content of the element M in the high-nickel positive electrode active material is 1,000 to 5,000 ppm.

6. The high-nickel positive electrode active material according to claim 1, wherein based on a total mass of the high-nickel positive electrode active material, a mass content of the element R in the second shell layer is 100 to 20,000 ppm.

7. The high-nickel positive electrode active material according to claim 1, wherein in the high-nickel positive electrode active material, a mass ratio of the element Si to the element R in the second shell layer is 0.1 to 7.0:1.

8. The high-nickel positive electrode active material according to claim 1, wherein based on a total mass of the high-nickel positive electrode active material, a total mass content of the elements silicon and aluminum in the first shell layer is 435 to 13,150 ppm.

9. The high-nickel positive electrode active material according to claim 1, wherein a volume-average particle size Dv50 of the high-nickel positive electrode active material is 1.5 to 20 $\mu$m, and a total thickness of the shell is 0.001 to 1 $\mu$m.

10. A method for preparing a high-nickel positive electrode active material, comprising:

coating a high-nickel ternary precursor with a silicon-aluminum hydroxide to obtain a first intermediate;

mixing and sintering the first intermediate and an M precursor and a lithium precursor to obtain a second intermediate; and mixing and sintering the second intermediate and an R precursor to obtain the high-nickel positive electrode active material;

wherein the high-nickel positive electrode active material is a core-shell structure, the core comprises $Li_{1+a}[Ni_xCo_yMn_zM_b]O_2$, wherein $0.6 \leq x < 1$, $0 < y < 0.3$, $0 < z < 0.3$, $0 < a < 0.2$, $0 < b < 0.2$, x+y+z+b=1, M being Sb;

the shell comprises a first shell layer coating the core, a second shell layer coating the first shell layer, and a transition layer formed between the first shell layer and the second shell layer; wherein the first shell layer is a fast ionic conductor consisting of four elements of lithium, aluminum, silicon and oxygen; and the second shell layer comprises an oxide of an element R, the element R being selected from at least one of B, Ti, P, or La; and the transition layer comprises $LiBO_2$.

11. The preparation method according to claim 10, wherein a process of coating the high-nickel ternary precursor with a silicon-aluminum hydroxide comprises:

dissolving an aluminum precursor and a silicon precursor in an alkaline solution, and then adding a high-nickel ternary precursor to obtain a solid-liquid mixture; and lowering the pH of the solid-liquid mixture to initiate a hydrolysis-in-situ precipitation reaction between the aluminum precursor and the silicon precursor, to obtain a high-nickel ternary precursor coated with a silicon-aluminum hydroxide.

12. A lithium-ion battery, comprising a high-nickel positive electrode active material according to claim 1.

13. A battery module, comprising the lithium-ion battery according to claim 12.

14. A high-nickel positive electrode active material with a core-shell structure, wherein the core comprises $Li_{1+a}[Ni_xCo_yMn_zM_b]O_2$, wherein $0.6 \leq x < 1$, $0 < y < 0.3$, $0 < z < 0.3$, $0 < a < 0.2$, $0 < b < 0.2$, x+y+z+b=1, M being Sb;

the shell comprises a first shell layer coating the core, a second shell layer coating the first shell layer, and a transition layer formed between the first shell layer and the second shell layer; wherein the first shell layer is a fast ionic conductor consisting of four elements of lithium, aluminum, silicon and oxygen;

the second shell layer comprises an oxide of an element R and a hydroxide $Co(OH)_2$, the element R being Co; and the transition layer comprises $LiBO_2$.

\* \* \* \* \*